US 8,761,260 B2

(12) United States Patent
Morita et al.

(10) Patent No.: US 8,761,260 B2
(45) Date of Patent: Jun. 24, 2014

(54) CUT DETECTION SYSTEM, SHOT DETECTION SYSTEM, SCENE DETECTION SYSTEM AND CUT DETECTION METHOD

(75) Inventors: Hiroyoshi Morita, Tokyo (JP); Atsunori Sakai, Tokyo (JP); Yasuo Masaki, Osaka (JP); Hirono Tsubota, Osaka (JP)

(73) Assignees: Funai Electric Co., Ltd., Osaka (JP); The University of Electro-Communications, Tokyo (JP)

( * ) Notice: Subject to any disclaimer, the term of this patent is extended or adjusted under 35 U.S.C. 154(b) by 1262 days.

(21) Appl. No.: 12/073,703

(22) Filed: Mar. 7, 2008

(65) Prior Publication Data

US 2009/0040390 A1   Feb. 12, 2009

(30) Foreign Application Priority Data

Aug. 8, 2007  (JP) .............................. P2007-206777

(51) Int. Cl.
  *H04B 1/66*   (2006.01)
  *H04N 7/12*   (2006.01)
  *H04N 11/02*  (2006.01)
  *H04N 11/04*  (2006.01)

(52) U.S. Cl.
  USPC ................................ 375/240.16; 375/240.12

(58) Field of Classification Search
  None
  See application file for complete search history.

(56) References Cited

U.S. PATENT DOCUMENTS

| | | | | |
|---|---|---|---|---|
| 6,473,459 B1* | 10/2002 | Sugano et al. | ........... | 375/240.16 |
| 7,027,509 B2* | 4/2006 | Jun et al. | ................... | 375/240.16 |
| 7,509,021 B2* | 3/2009 | Mughal et al. | ............... | 386/351 |
| 2004/0017389 A1* | 1/2004 | Pan et al. | ....................... | 345/723 |
| 2004/0125877 A1* | 7/2004 | Chang et al. | ............. | 375/240.28 |
| 2005/0195331 A1 | 9/2005 | Sugano et al. | | |
| 2008/0118153 A1* | 5/2008 | Wu et al. | ....................... | 382/190 |

FOREIGN PATENT DOCUMENTS

| | | |
|---|---|---|
| JP | 07-284071 | 10/1995 |
| JP | 2004-295923 A | 10/2004 |
| JP | 2005-252860 | 9/2005 |

OTHER PUBLICATIONS

"Scene Detection from Soccer Imeges Using MPEG2 Feature Amount," 2006 Department of Information System Opreations, Master's Theses Presentations.
Japanese Office Action dated Feb. 14, 2012, issued in a corresponding Japanese patent application.
Aoki, Shingo, et al. "Cut detection in MPEG2 compressed data using macro block types," Information Processing Society of Japan, Oct. 15, 2005, vol. 46, No. SIG 15 (CVIM 12), pp. 51-58.

(Continued)

*Primary Examiner* — Mehrdad Dastouri
*Assistant Examiner* — Kristin Dobbs
(74) *Attorney, Agent, or Firm* — Morgan, Lewis & Bockius LLP

(57) ABSTRACT

A cut detection system includes: an extractor configured to extract macroblock type information at least for every B frame from video compressed data including the macroblock type information; a calculator configured to calculate the number of intra-coded macroblocks for every frame from the extracted macroblock type information; and a detector configured to detect the B frame or a group of picture including the B frame to be a replay cut portion, which is a head portion or last portion of a replay shot, by using a frequency characteristic of the intra-coded macroblocks included in the B frame as determination conditions.

14 Claims, 19 Drawing Sheets

(56) References Cited

OTHER PUBLICATIONS

Kawai, Yoshihiko, et al. "Detection of replay scenes in broadcasted sports video by focusing on digital video effects," The Institute of Electronics, Information and Communication Engineers Transaction, Feb. 1, 2001, J84-D-II, 2nd issue, pp. 432-435.

* cited by examiner

LUMINANCE AND COLOR DIFFERENCE
COMPONENTS OF MACROBLOCK

EXTRACTION OF CHARACTERISTIC AMOUNT

STRUCTURE OF MOVING IMAGE

CODING SEQUENCE AND REFERENCE DIRECTION

IMAGES INSERTED AT START AND END OF REPLAY SHOT

RELATIONSHIP BETWEEN REPLAY CUT AND REPLAY SHOT

FIG. 10
(a) CASE OF i
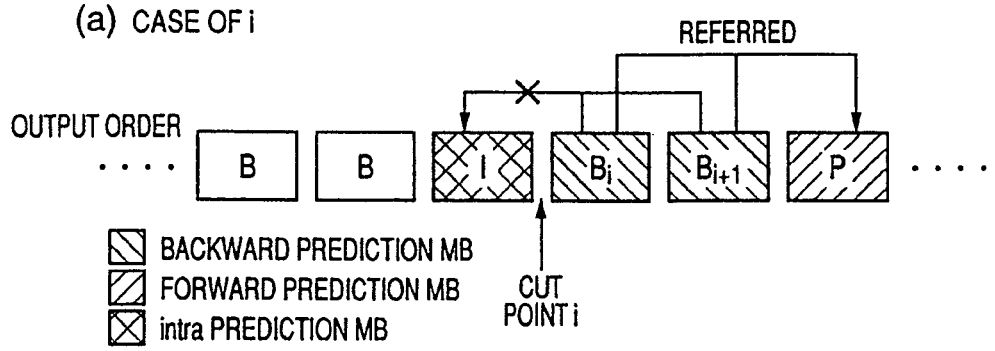
(b) CASE OF ii
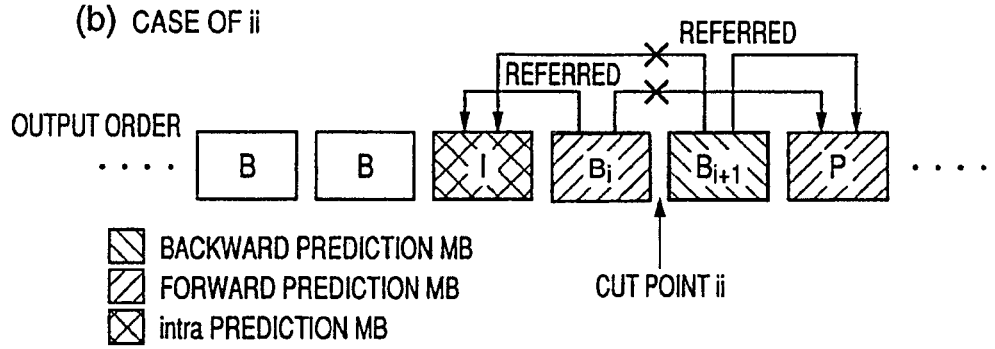
(c) CASE OF iii
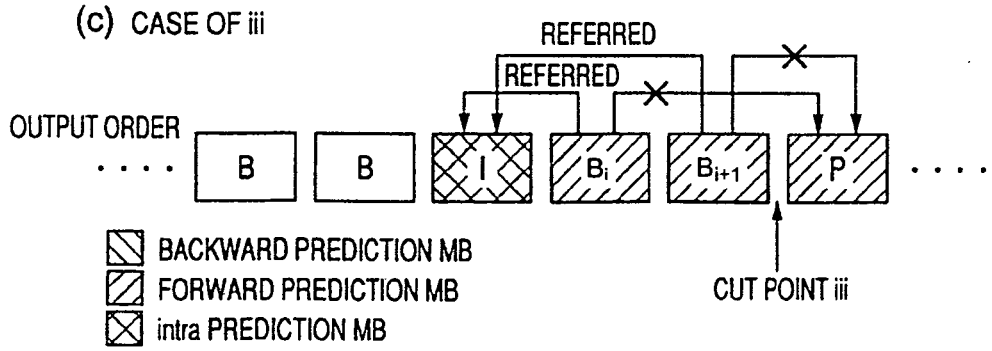

FIG. 11

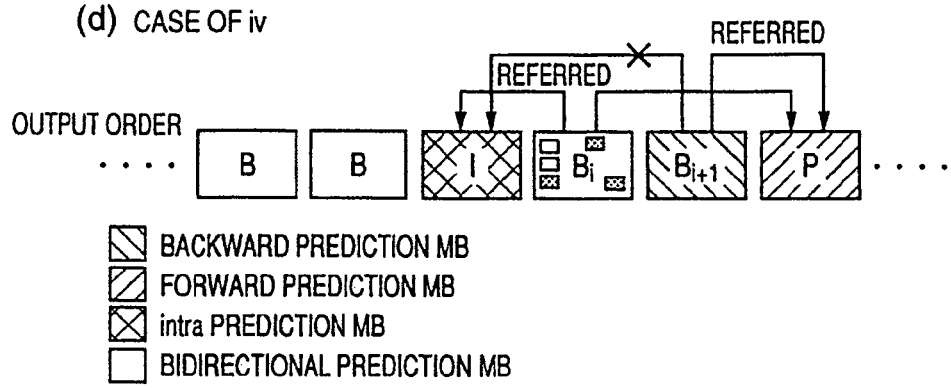

FIG. 12

| FrameType | CONDITION |
|---|---|
| 0 | mbForward HAS HIGHEST FREQUENCY AND 100 > (mbBack + mbInter) |
| 1 | mbForward HAS HIGHEST FREQUENCY AND 350 > (mbBack + mbInter) ≥ 100 |
| 2 | mbForward HAS HIGHEST FREQUENCY AND (mbBack + mbInter) ≥ 350 |
| 3 | mbBack HAS HIGHEST FREQUENCY AND 100 > (mbForward + mbInter) |
| 4 | mbBack HAS HIGHEST FREQUENCY AND 350 > (mbForward + mbInter) ≥ 100 |
| 5 | mbBack HAS HIGHEST FREQUENCY AND (mbForward + mbInter) ≥ 350 |
| 6 | mbInter HAS HIGHEST FREQUENCY |
| 7 | mbIntra ≥ 100 (WHEN FrameType IS 2, 5, OR 6) |
| 8 | 100 > mbIntra ≥ 20 (WHEN FrameType IS 2, 5, OR 6) |

CONDITION OF FrameType

< FrameType PATTERN OF INSTANTANEOUS CUT POINT >
- $b_1$: 0 or $b_2$: 3
- pair: (1, 1), (1, 4), (4, 4), (1, 7), (1, 8), (7, 4), (8, 4)

< FrameType PATTERN OF REPLAY CUT PORTION >
- $b_1$ or $b_2$: 7
- $b_1$ or $b_2$: THREE OR MORE PAIRS WHICH BECOME 8 ARE PRESENT BETWEEN TWO GOPS

DISCRIMINATION OF REPLAY SHOT FROM REPLAY CUT PORTION

CLASSIFICATION OF SHOTS

CHANGE IN MOTION VECTOR AMOUNT IN ONE SHOT

FIG. 18
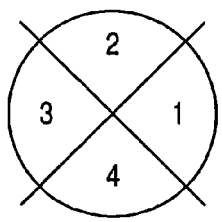
QUANTIZATION OF DIRECTION
FIG. 19
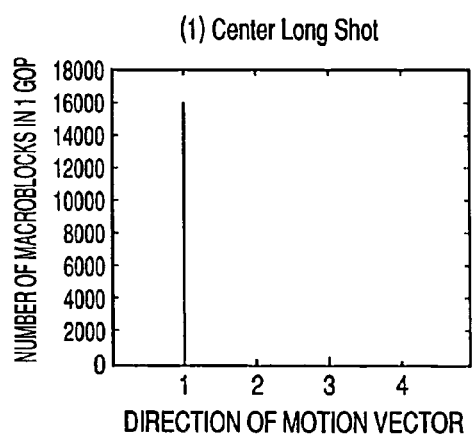
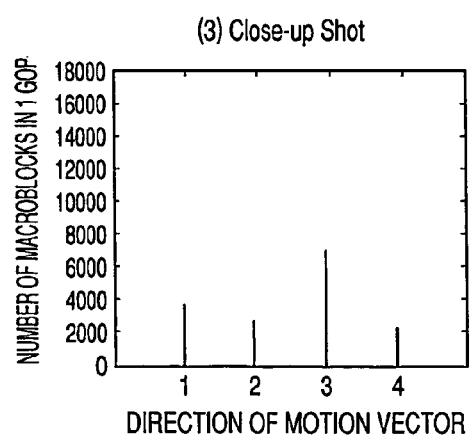
QUANTIZATION BASED ON DIRECTION OF MOTION VECTOR $\overline{D} = 0.22$        $\overline{D} = 0.17$ (1) CHANGE IN VARIANCE IN DIRECTION OF
MOTION VECTOR IN Center Long Shot $\overline{D} = 0.64$        $\overline{D} = 0.69$ (3) CHANGE IN VARIANCE IN DIRECTION OF
MOTION VECTOR IN Close-up Shot

FIG. 22
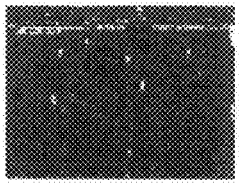
(1) Center Long Shot
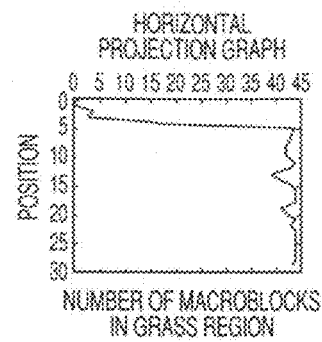
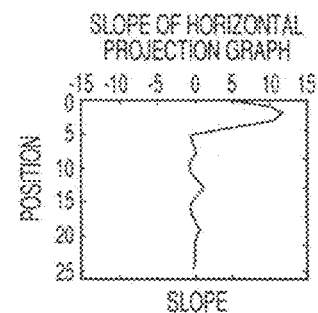
(1) SLOPE OF GROUND REGION IN Center Long Shot
FIG. 23
(2) Goal Long Shot
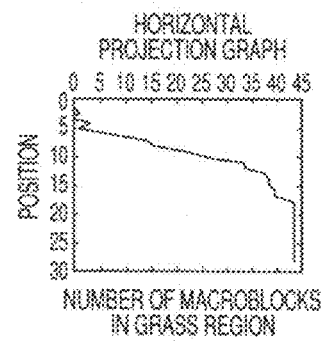
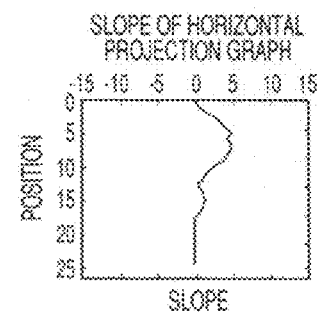
(2) SLOPE OF GROUND REGION IN Goal Long Shot
FIG. 24
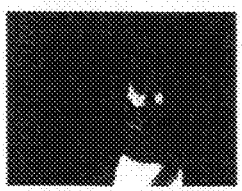
(3) Close-up Shot
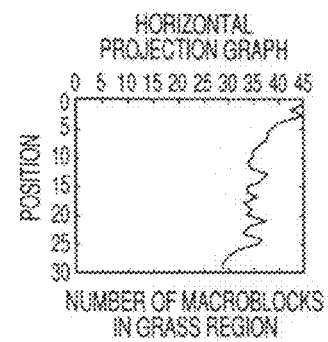
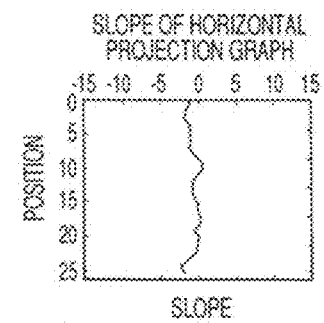
(3) SLOPE OF GROUND REGION IN Close-up Shot

FIG. 4. 15: NUMBER OF MACROBLOCKS IN GRASS REGION WITHIN I FRMAE

ONE TO THREE (3) Close-up Shot ARE INSERTED
FLOW OF SHOT IN SHOOT SCENE

THREE TO SIX (3) Close-up Shot ARE INSERTED
FLOW OF SHOT IN GOAL SCENE

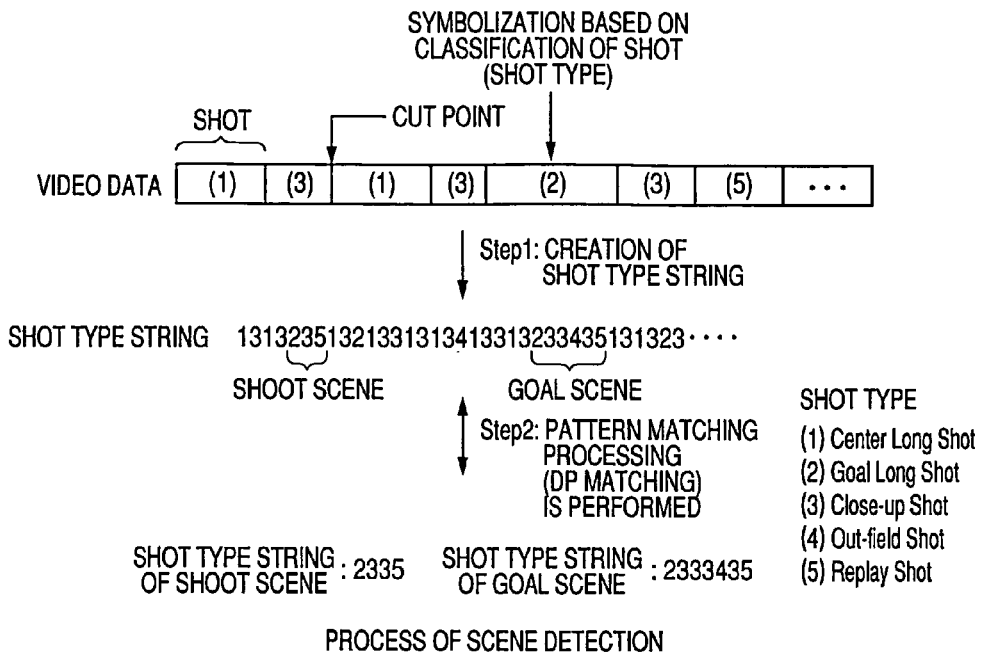
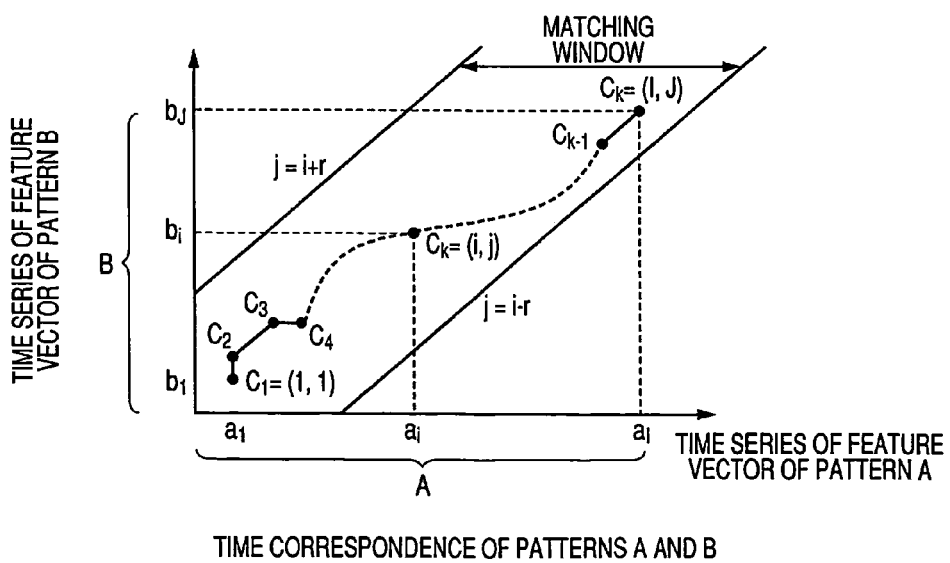

CALCULATION OF PARTIAL SUM g(i, j) AT POINT (i, j)

PATTERN MATCHING METHOD

FIG. 34

DETECTION RESULT OF CUT POINT

■ METHOD OF EVALUATING CUT POINT DETECTION

CC(Correct Cut): KNOWN CORRECT CUT POINT NUMBER
CDC(Correct Detected Cut): CORRECT DETECTED CUT POINT NUMBER
ADC(All Detected Cut): ALL DETECTED CUT POINT NUMBER Recall: REPRODUCTION RATE OF CUT POINT DETECTION    Recall = CDC/CC ×100

Precision: APPROPRIATENESS OF CUT POINT DETECTION    Precision = CDC/ADC ×100

■ DETECTION RESULT OF CUT POINT

| | CC | CDC | ADC | Recall | Precision |
|---|---|---|---|---|---|
| Soccer1 (90 MINUTES) | 657 | 629 | 636 | 95.7% | 98.9% |
| Soccer2 (90 MINUTES) | 669 | 635 | 649 | 94.9% | 97.9% |
| TOTAL SUM OF SIX GAMES | 3298 | 3146 | 3298 | 95.3% | 97.3% |

FIG. 35

CLASSIFICATION RESULT OF SHOT

■ METHOD OF EVALUATING SHOT CLASSIFICATION

CSH(Correct Shot): KNOWN CORRECT SHOT NUMBER
CCSH(Correct Classified Shot): CORRECT CLASSIFIED SHOT NUMBER
CDSH(Correct Detected Shot): SHOT NUMBER WHERE SECTION OF SHOT IS CORRECTLY DETECTED
RCC(Rate of Correct Classificaion): RATE OF SHOT CLASSIFICATION
    RCC = CCSH/CDSH×100
RCR(Rate of Correct Recognition): RATE OF SHOT RECOGNITION
    RCR = CCSH/CSH×100

■ CLASSIFICATION RESULT OF SHOT

| | CSH | CCSH | CDSH | RCC | RCR |
|---|---|---|---|---|---|
| Soccer1 (90 MINUTES) | 657 | 557 | 597 | 93.3% | 84.8% |
| Soccer2 (90 MINUTES) | 669 | 530 | 616 | 86.0% | 79.2% |
| TOTAL SUM OF SIX GAMES | 3298 | 2680 | 2987 | 89.7% | 81.3% |

FIG. 36

DETECTION RESULT OF REPLAY SHOT

■ METHOD OF EVALUATING REPLAY SHOT DETECTION

- CRS(Correct Replay Shot): KNOWN CORRECT REPLAY SHOT NUMBER
- CDRS(Correct Detected Replay Shot): CORRECT DETECTED REPLAY SHOT NUMBER
- ADRS(All Detected Replay Shot): ALL DETECTED REPLAY SHOT NUMBER
- Recall: REPRODUCTION RATE OF REPLAY SHOT DETECTION   Recall = CDRS/CRS x100
- Precision: APPROPRIATENESS OF REPLAY SHOT DETECTION

■ DETECTION RESULT OF REPLAY SHOT

|  | CRS | CDRS | ADRS | Recall | Precision |
|---|---|---|---|---|---|
| Soccer1 (90 MINUTES) | 25 | 20 | 23 | 80.0% | 87.0% |
| Soccer2 (90 MINUTES) | 36 | 29 | 32 | 80.6% | 90.6% |

FIG. 37

EXTRACTION RESULT OF SCENE

■ METHOD OF EVALUATING SCENE EXTRACTION

- CS(Correct Scene): KNOWN CORRECT SCENE NUMBER
- CDS(Correct Detected Scene): CORRECT DETECTED SCENE NUMBER
- ADS(All Detected Scene): ALL DETECTED SCENE NUMBER
- Recall: REPRODUCTION RATE OF SCENE DETECTION   Recall = CDS/CS x100
- Precision: APPROPRIATENESS OF SCENE DETECTION   Precision = CDS/ADS x100

■ EXTRACTION RESULT OF SCENE          (TOTAL SUM OF SIX GAMES)

|  | CS | CDS | ADS | Recall | Precision |
|---|---|---|---|---|---|
| SHOOT SCENE | 77 | 58 | 72 | 75.3% | 80.6% |
| GOAL SCENE | 19 | 16 | 21 | 84.2% | 76.2% |

CUT DETECTION SYSTEM, SHOT DETECTION SYSTEM, SCENE DETECTION SYSTEM AND CUT DETECTION METHOD

BACKGROUND

The present invention relates to a cut detection system, a shot detection system, a scene detection system, and a cut detection method for detecting a cut portion that is the divided position of a shot, the type of a shot, a scene configured to include a plurality of continuous shots, and the like from video data.

In recent years, the number of images that users can see increases as image distribution according to broadband coverage of Internet is performed and the number of channels increases due to satellite broadcasting or cable televisions. In addition, as the storage technology is rapidly developed, an HDD recorder in which a hard disk having a large capacity exceeding terabytes is also available, and it has become common to store a large amount of program (content) in a hard disk of a PC or a recorder. As a result, an individual has come to use video data frequently.

In addition, as the amount of video data increases as described above, it has become difficult to quickly search a desired scene in the video data. For this reason, a technique for efficiently and quickly accessing a required scene from a large amount of video data is becoming important.

Therefore, for example, in the invention disclosed in Japanese Patent Application Publication No. 2005-252860, a specific shot or a part of a scene is determined from a rate of the grass occupying a screen, a motion vector, a characteristic of cheer, and the like.

Furthermore, in the invention disclosed in Japanese Patent Application Publication No. 07-284071, cut positions which are divided positions of a plurality of shots are detected by checking the size relationship between the forward predictive-coded block number and the backward predictive-coded block number in a bidirectionally predictive-coded frame.

However, for a replay shot that shows repetition of a previous image, it was difficult to detect the divided position (cut portion) and the range.

In addition, also for a shot other than the replay shot, it was difficult to clearly classify the type of the shot or to extract a scene having a plurality of continuous shots as continuous scenes with a story.

SUMMARY

The present invention has been finalized in view of the above situation in the related art, and it is an object of the present invention to provide a cut detection system capable of detecting a replay cut portion, which is a head portion or last portion of a replay shot, and a cut detection system, a shot detection system, a scene detection system, and a cut detection method capable of determining a replay shot and other specific shots with high precision.

According to the present invention, there is provided a cut detection system including: an extractor configured to extract macroblock type information at least for every B frame from video compressed data including the macroblock type information; a calculator configured to calculate the number of intra-coded macroblocks for every frame from the extracted macroblock type information; and a detector configured to detect the B frame or a group of picture including the B frame to be a replay cut portion, which is a head portion or last portion of a replay shot, by using a frequency characteristic of the intra-coded macroblocks included in the B frame as determination conditions.

In the determination conditions, a condition that the number of intra-coded macroblocks in at least one of two continuous B frames is equal to or larger than a predetermined number is included.

In the determination conditions, a condition that the number of intra-coded macroblocks in at least one of two continuous B frames is in a predetermined range and the number of two B frames having the pattern is equal to or larger than a predetermined number in a plurality of groups of pictures is included.

A calculator for calculating the number of forward predictive-coded macroblocks for every frame and the number of backward predictive-coded macroblocks for every frame from the macroblock type information is included, and one of three conditions of a condition where the number of forward predictive-coded macroblocks is a maximum frequency and the sum of the number of backward predictive-coded macroblocks and the number of intra-coded macroblocks is equal to or larger than a predetermined number, a condition where the number of backward predictive-coded macroblocks is a maximum frequency and the sum of the number of forward predictive-coded macroblocks and the number of intra-coded macroblocks is equal to or larger than a predetermined number, and a condition where the number of intra-coded macroblocks is a maximum frequency is included as a condition added to the determination conditions.

There is provided a shot detection system using the above-described cut detection system that determines a portion between two continuous replay cut portions within a plurality of replay cut portions, which are detected by the cut detection system, to be a replay shot.

When two continuous replay cut portions within a plurality of replay cut portions, which are detected by the cut detection system, are positioned between two continuous instantaneous cut points, a portion between the two continuous replay cut portions is determined to be a replay shot that shows repetition of a previous image.

A condition that a predetermined number of groups of pictures or more are included between one of the two continuous replay cut portions and an instantaneous cut point subsequent to the one replay cut portion is added to the determination conditions of the replay shot.

A condition that a predetermined number of groups of pictures or more are included between the two continuous replay cut portions is added to the determination conditions of the replay shot.

An extractor for extracting motion vector information for every frame regarding a shot extracted from video compressed data, a calculator for calculating a motion vector amount for every frame from the motion vector information, and a calculator for calculating an average motion vector amount, which is obtained by dividing the motion vector amount of one shot by the number of groups of pictures, regarding the extracted shot are included, and the extracted shot is determined as a specific shot by using a determination condition that the average motion vector amount is within a predetermined range.

An extractor for extracting motion vector information for every frame regarding a shot extracted from video compressed data, a quantizing unit for quantizing the direction of a motion vector in a predetermined number of directions for every macroblock of each frame, a calculator for calculating a degree of dispersion for every frame regarding the directions of motion vectors classified by the quantization, and a calculator for calculating an average degree of dispersion, which is obtained by dividing the degree of dispersion of one shot by the number of groups of pictures, regarding the extracted shot are included, and the extracted shot is determined as a specific shot by using a determination condition that the degree of dispersion is within a predetermined range.

An extractor for extracting a luminance component Y, a color difference component Cb, and a color difference component Cr for every I frame from video compressed data, a divider for dividing each I frame into a plurality of parallel lines and calculating the number of macroblocks satisfying a color condition, in which each of the luminance component Y, the color difference component Cb, the color difference component Cr, and a ratio between the color difference components r=Cb/Cr, for each of the lines, and a calculator for calculating an average value of lines, in which the number of macroblocks satisfying the color condition is within a predetermined range, for every I frame are included, and a shot including an I frame where the average value is within the predetermined range is determined as a specific shot.

A degree of a change in the number of macroblocks with respect to the line change is calculated for every I frame, and a shot including an I frame where a maximum value of the degree is within a predetermined range is determined as a specific shot.

According to the present invention, there is provided a scene detection system using the above-described shot detection system including: a generator for generating a shot symbol string by giving a shot symbol corresponding to the type to each shot detected by the shot detection system; a storage for storing a model pattern symbol string which is obtained by arraying the plurality of shot symbols so as to correspond to a scene to be detected; and a detector for detecting a symbol string, which corresponds to the model pattern symbol string of the model pattern storage, from the shot symbol string. Continuous shots of the video data corresponding to the symbol string detected by the detector are recognized as a specific scene.

The detector performs pattern matching processing for detecting a symbol string, which approximately matches the model pattern symbol string, from the shot symbol string by comparing the shot symbol string with the model pattern symbol string.

According to the present invention, there is provided a cut detection method including: extracting macroblock type information at least for every B frame from video compressed data including the macroblock type information by a computer; calculating the number of intra-coded macroblocks for every frame from the extracted macroblock type information by the computer; and determining the B frame or a group of picture including the B frame to be a replay cut portion, which is a head portion or last portion of a replay shot, by using a frequency characteristic of the intra-coded macroblocks included in the B frame as determination conditions by the computer.

According to the above configuration, the macroblock type information is extracted from video compressed data, and the number of intra-coded macroblocks for every frame is calculated from the extracted macroblock type information.

The number of intra-coded macroblocks tends to increase relatively in the B frame on the head side or last side of a replay shot. Accordingly, by using the determination condition that the number of intra-coded macroblocks included in the B frame is in a predetermined range, the B frame or a group of picture including the B frame can be determined to be a replay cut portion which is a head portion or last portion of a replay shot, and a portion between the two continuous replay cut portions can also be determined as a replay shot.

BRIEF DESCRIPTION OF THE DRAWINGS

FIG. 10 is a conceptual view illustrating the relationship between the position where a cut point occurs and a frame that a B frame refers.

FIG. 11 is a conceptual view illustrating the relationship between the position where a cut point occurs and a frame that a B frame refers.

FIG. 12 is a table illustrating the relationship of an MBT symbol and a condition for giving the MBT symbol.

FIG. 18 is a conceptual view illustrating the quantization of direction.

FIG. 19 is a graph illustrating the relationship between the direction of a motion vector quantized and the number of macroblocks.

FIG. 22 is a graph illustrating the slope of a ground region in a center long shot.

FIG. 23 is a graph illustrating the slope of a ground region in a goal long shot.

FIG. 24 is a graph illustrating the slope of a ground region in a close-up shot.

FIG. 30 is a conceptual view illustrating the flow of scene detection.

FIG. 31 is a graph illustrating the time correspondence of patterns A and B in DP matching processing.

FIG. 34 is an explanatory view and a table illustrating a detection method at a cut point and a detection result.

FIG. 35 is an explanatory view and a table illustrating a shot classification method and a classification result.

FIG. 36 is an explanatory view and a table illustrating a detection method in a replay shot and a detection result.

FIG. 37 is an explanatory view and a table illustrating a scene detection method and a detection result.

DETAILED DESCRIPTION OF THE EMBODIMENTS

Hereinafter, embodiments of the present invention will be described with reference to the accompanying drawings.

Figure 1:
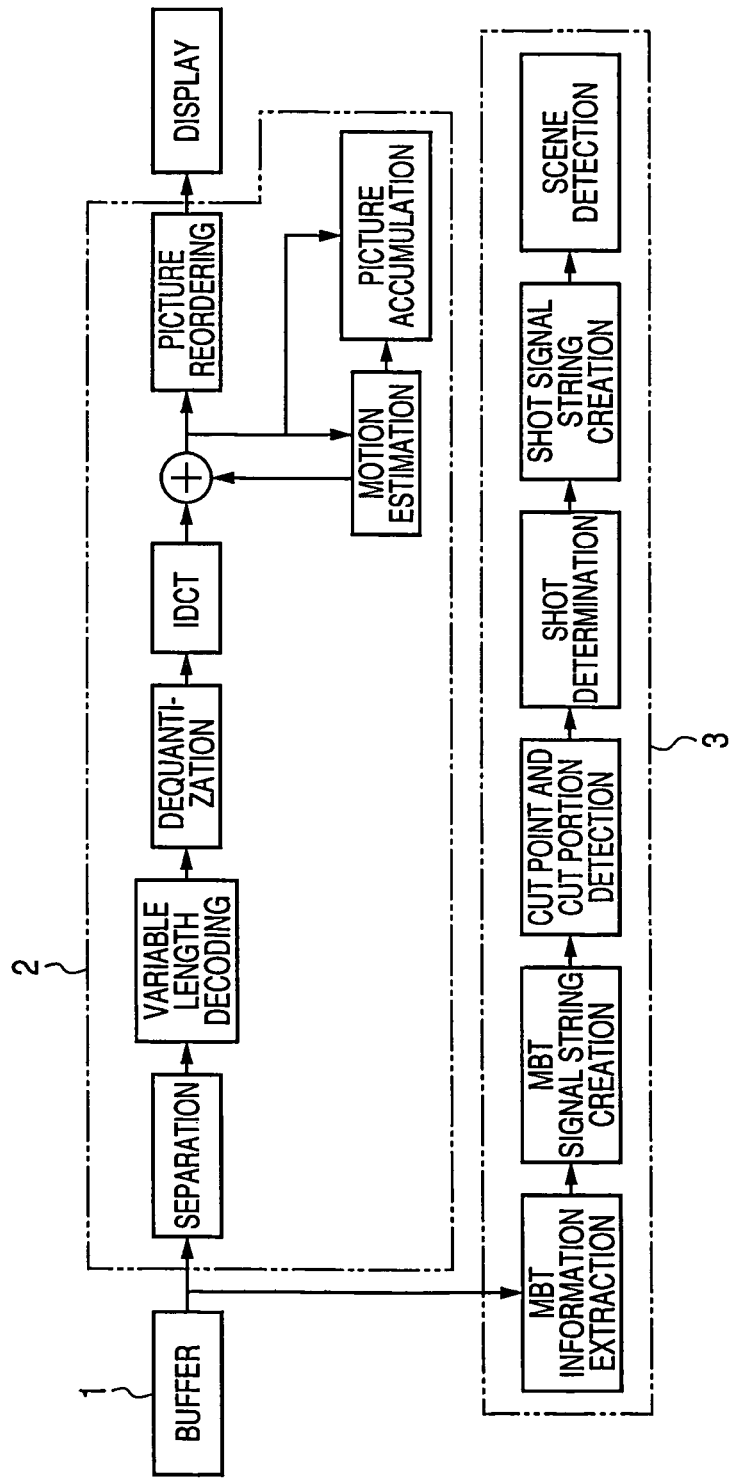
FIG. 1 is a block diagram illustrating an example of a cut detection system, a shot detection system, and a scene detection system according to the present invention.

FIG. 1 is a block diagram illustrating an example of the present invention. In order to clarify the features of the present invention, the configuration of a typical MPEG decoder is shown together in this block diagram.

As shown in FIG. 1, video compressed data stored in a recording medium, such as a DVD or a hard disk, is input to a decoder 2 through a buffer 1. On the other hand, a cut detection system, a shot detection system, and a scene detection system 3 according to the present invention extract MBT information (macroblock type information) from the video compressed data before decoding.

Such configurations are realized as apparatuses, such as a computer and a DVD recorder, and electronic circuits or programs for operating the apparatuses, for example.

The decoder 2 is a device for decoding video compressed data on the basis of known decoding processing, such as variable length decoding, dequantization, and inverse discrete cosine transformation (IDCT), and a moving image decoded by the decoder 2 is displayed on a display device, such as a display.

The cut detection system, the shot detection system, and the scene detection system 3 according to the present embodiment directly extract the macroblock type information (hereinafter, also referred to as 'MBT information') from the video compressed data, create a macroblock type symbol string (hereinafter, also referred to as a 'MBT symbol string') from the MBT information, and detect an instantaneous cut point or a cut portion, such as a replay cut portion, using the MBT symbol string.

In addition, the cut detection system, the shot detection system, and the scene detection system 3 divide the video data, which has the cut portion as a separated position, into a plurality of shots including a replay shot.

Then, the cut detection system, the shot detection system, and the scene detection system 3 identify the shots with a plurality of classification patterns on the basis of the motion vector or a characteristic amount, such as a luminance component Y, a color difference component Cb, a color difference component Cr, and a rate of color difference components r=Cb/Cr, apply to the shots the shot symbols which are different for every type, and create the shot symbol string arranged in the order of shots.

In addition, the cut detection system, the shot detection system, and the scene detection system 3 detect a scene by searching a specific pattern from the shot symbol string by search processing (pattern matching processing).

According to an example of the present embodiment, MPEG2 data obtained by compression coding of soccer game video data is used as the video compressed data.

As the MPEG2 format, the following three frame types are used when compressing the video data.

Intra-coded Frame (I Frame)

Frame for performing only compression within the frame without using information of other frames Predictive-coded Frame (P Frame)

Frame for performing forward motion predictive coding on the time axis by using past I and P frames as reference frames other than the compression within the frame Bidirectionally Predictive-coded Frame (B Frame)

Frame for performing bidirectionally predictive coding on the time axis by using past I and P frames as reference frames other than the compression within the frame The video data compressed in MPEG2 format is collected in the unit of group of picture (hereinafter, referred to as 'GOP'), and one GOP is usually configured to include 15-frame data for 0.5 second. In addition, the configuration of the frame type in the GOP is decided for every video data, and a normal pattern called IBBPBBPBBPBBPBB, that is, a pattern including two continuous B frames periodically is used in the present embodiment.

A method called Closed GOP and a method called Open GOP exist in the GOP.

The Closed GOP is a method of not referring to the immediately previous GOP and performs coding only within one GOP. For this reason, in initial two B frames of the GOP, all macroblocks necessarily become the backward prediction. On the other hand, the Open GOP is a method of referring to the immediately previous GDP. Since the forward direction prediction is also possible for the initial two B frames of the GOP, the compression rate based on coding in the Open GOP is higher than that in the Closed GOP.

Moreover, in the Open GOP, the number of frames in the GOP may be reduced in a portion where an image changes. For example, the number of frames included in the GOP decreases to the numbers of multiples of 3, such as three frames, six frames, nine frames, and twelve frames. The precision of cut point detection can be improved by using such a characteristic.

In the present embodiment, MPEG data coded in the Open GOP method, which can relatively easily detect the cut portion and in which the compression efficiency is high, is used by using such a characteristic.

Next, a coding method in MPEG2 will be described.

Usually, in the MPEG compression, one image frame is divided into 8×8 blocks and then the discrete cosine transformation is performed for every block. Four blocks of the luminance and two blocks of color difference (Cb, Cr) are called macroblocks. Since the block size of motion compensation is 16 pixels×16 pixels while the size of DCT (discrete cosine transformation) is 8 pixels×8 pixels, the structure combining them is a macroblock. This macroblock serves as a unit in which prediction to a reference image is performed. In addition, in case of the MPEG, a study of improving the compression effect by referring to previous and subsequent I and P frames when performing coding is made. For this reason, examples of coding in a macroblock unit include four kinds of methods of intra coding, forward predictive coding, backward predictive coding, and bidirectionally predictive coding. Each of the coding methods has the following characteristic.

Intra Coding

Coding method of restoring a pixel value without referring to other images

Forward Predictive Coding

Coding method of restoring a pixel value by referring to past images

Backward Predictive Coding

Coding method of restoring a pixel value by referring to future images

Bidirectionally Predictive Coding

Coding method of restoring a pixel value by averaging two predictions in the forward and backward directions between corresponding pixels Each macroblock is coded by using the four methods. There are three kinds of frames (I, P, B) in MPEG2.

The I frame can select only the intra coding.

The P frame can select the forward predictive coding that uses the immediately previous I frame or P frame as a reference frame in addition to the intra coding.

The B frame can select the backward predictive coding that uses the subsequent I frame or P frame as a reference frame and the bidirectionally predictive coding that use immediately previous and immediately subsequent I and P frames as reference frames in addition to the intra coding and the forward predictive coding.

Each frame is divided into units called macroblocks, and each macroblock is assigned an attribute called a macroblock type. The macroblock is coded by using the coding method which can be selected for every frame.

It is decided in the unit of a macroblock in a phase of coding which one of the four coding methods is to be selected, and the selected method is embedded as a macroblock type into the MPEG coded data which is video compressed data used in the present embodiment.

Next, a format of the MPEG2 will be described.

There are component digitized formats called 422 and 420 in a moving image.

In the case of the 422 format, two color difference images when a luminance image has the size of 720 pixel×480 pixel each have a longitudinal shape of 360 pixel×480 pixel obtained by sub-sampling (for example, thinning out) in the horizontal direction.

Figure 2:
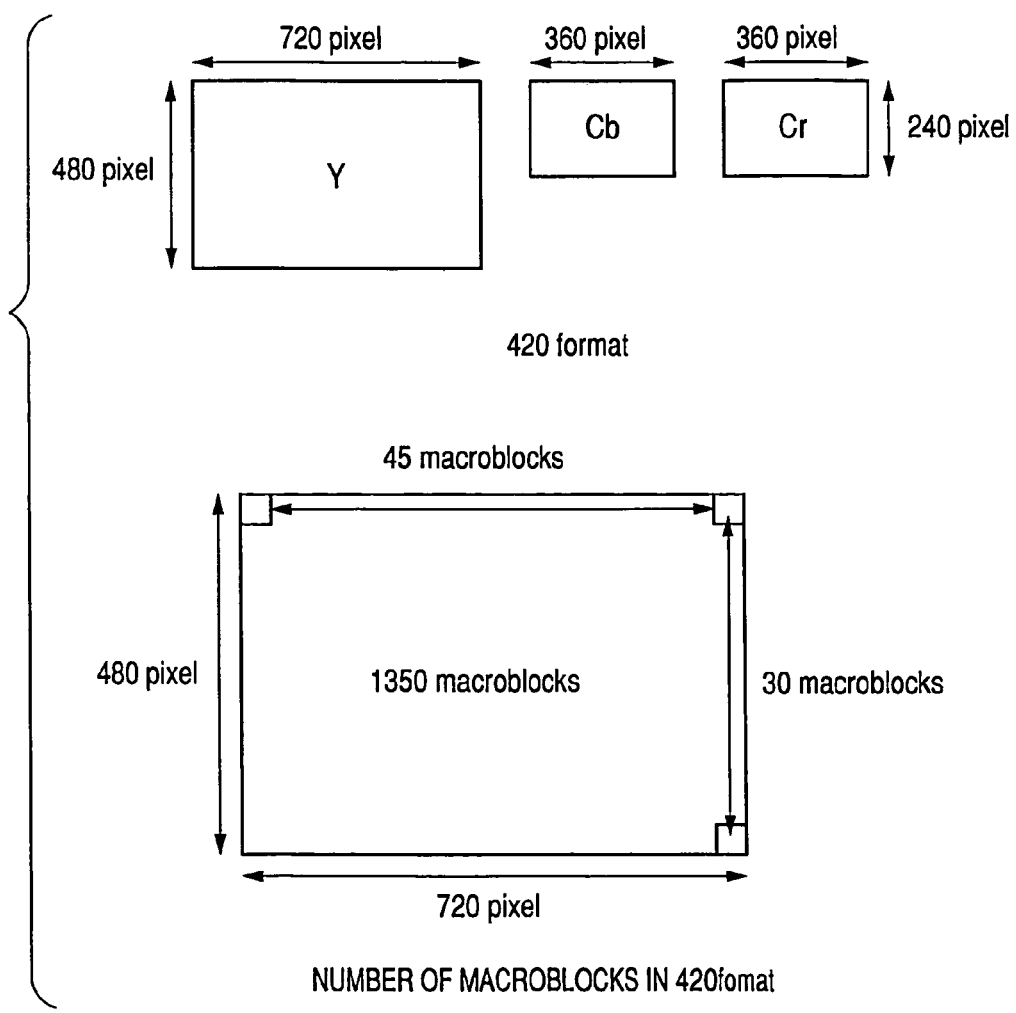
FIG. 2 is a conceptual view illustrating macroblocks in a typical 420 format.

On the other hand, the 420 format is an image format in which the color difference is further sub-sampled in the vertical direction as shown in FIG. 2. The size of the color difference image changes to ½ of the luminance image in both the horizontal and vertical directions. This is a format that is most generally used in moving image coding. In an example of 420, a luminance image (Y) and two color difference images (Cb, Cr) having the same aspect ratio are treated as a set. In addition, each frame is configured to include 45×30 macroblocks.

As MPEG data used in the present embodiment, a moving image that is component digitized by the 420 format is used.

Next, a characteristic amount in the present embodiment that is extracted from MPEG2 data and is used in detecting the cut portion and determining a shot will be described.

In the present embodiment, the following three kinds of information are extracted from MPEG2 data to be used.

Macroblock type

Motion vector

Luminance and color difference of macroblock (DC components)

The macroblock type is information indicating which frame of previous and subsequent frames is referred by each macroblock. As described above, four kinds of methods are mentioned as coding methods in the macroblock unit, and these four methods correspond to the following four macroblock types.

Intra-coded macroblock type

Forward predictive-coded macroblock type

Backward predictive-coded macroblock type

Bidirectionally predictive-coded macroblock type

These four macroblock types are written, as codes corresponding to every macroblock, into a macroblock layer of MPEG video compressed data.

In the B frame, four macroblock types can be selected, and it can be seen that there is a large variation in the number of macroblock types in one frame according to an image referred. A point where an image changes can be detected by using such a characteristic.

In addition, a color image is expressed with three values of RGB or three images. When this is expressed with the luminance (Y) and two color differences (Cb, Cr) by linear transformation, the spatial resolution of the color difference image can be reduced. The luminance indicates the brightness and the color difference indicates the level of a color.

In the MPEG, the discrete cosine transformation (DCT) is performed as a coding method in order to reduce redundant information. The DCT functions to concentrate an image signal on a small low-band coefficient and is used to reduce the amount of information in the spatial directions of an image. The DCT is considered as the most effective transformation for image coding among orthogonal transformations of fixed transformation coefficient.

Figure 3:
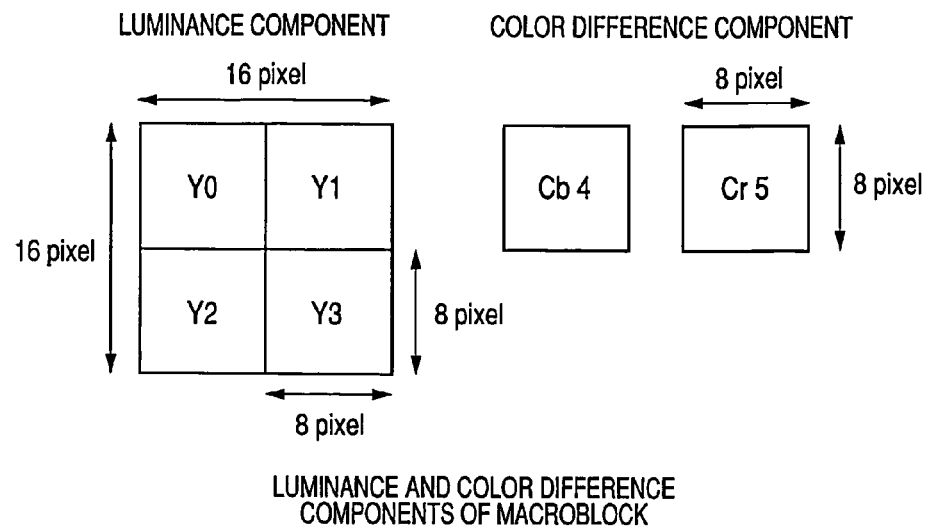
FIG. 3 is a conceptual view illustrating luminance and color difference components of a typical macroblock.

Since a direct current component after DCT is called a DC component and indicates an average value of the 8 pixel×8 pixel block, DC components of luminance and color difference are used as color information used for the characteristic amount. The luminance and color difference components of a macroblock are shown in FIG. 3. As shown in FIG. 3, in case of the 420 format, four luminance components, one color difference component of Cb, and one color difference component of Cr are included in one macroblock. Color information on the ground area is extracted by using the DC components of the luminance and color difference so that the color information is used for determination of a shot. In addition, the color difference components of Cb and Cr and only one luminance component positioned at the upper left side of the four luminance block in one macroblock are used as the characteristic amount used for shot determination.

Next, the motion vector used in the present embodiment will be described.

The motion vector indicates the amount of pixel-unit deviation between the macroblock position of a current image and the position where a predicted image is to be referred when calculating the difference of the predicted image in the current image.

In the case of MPEG2, the motion vector occurs in a macroblock in the unit of 16 pixel×16 pixel, and a distance from the current macroblock to the position to be referred is expressed with an X component and a y component. At this time, the rightward direction is positive in the case of the X component, and the downward direction is positive in the case of the y component.

In addition, a motion vector expressing the difference between the current image and a past image is called a forward motion vector, and a motion vector expressing the difference between the current image and a future image is called a backward motion vector.

In case of the I frame, the motion vector does not occur because inter-frame prediction is not performed. In case of the P frame, only the forward motion vector occurs because inter-frame prediction related to the past I or P frame is not performed. In case of the B frame, two motion vectors of the forward motion vector and the backward motion vector occur because both past and future I and P frames can be referred. The motion vector expresses the characteristic of motion in an image and the characteristic of the flow of the image corresponding to the movement of a camera since inter-frame prediction is performed.

In the present embodiment, the motion vector is used as the characteristic amount for determining the shot classification. In addition, only the forward motion vector in the P and B frames considered as the sufficient amount is used as the characteristic amount in order to calculate the characteristic of the motion.

Figure 4:
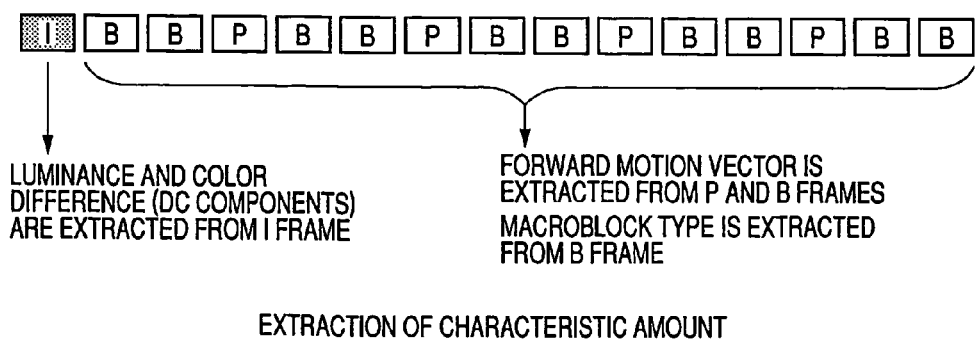
FIG. 4 is a conceptual view illustrating a frame from which a characteristic amount is extracted in an example of the present invention.

FIG. 4 shows which kind of characteristic amount is extracted from which frame of video compressed data in the present embodiment.

That is, DC components of the luminance and color difference of a macroblock is extracted from the I frame. In addition, the forward motion vector is extracted from the P and B frames. Such information including the luminance and color difference and the motion vector are used for determination of shot classification.

In addition, the macroblock type is extracted from the B frame. This macroblock type is used for detection of a cut point and a replay cut portion.

Here, the concepts of scene, shot, cut point, and replay cut portion will be described in detail by using a soccer game image as an example.

Figure 5:
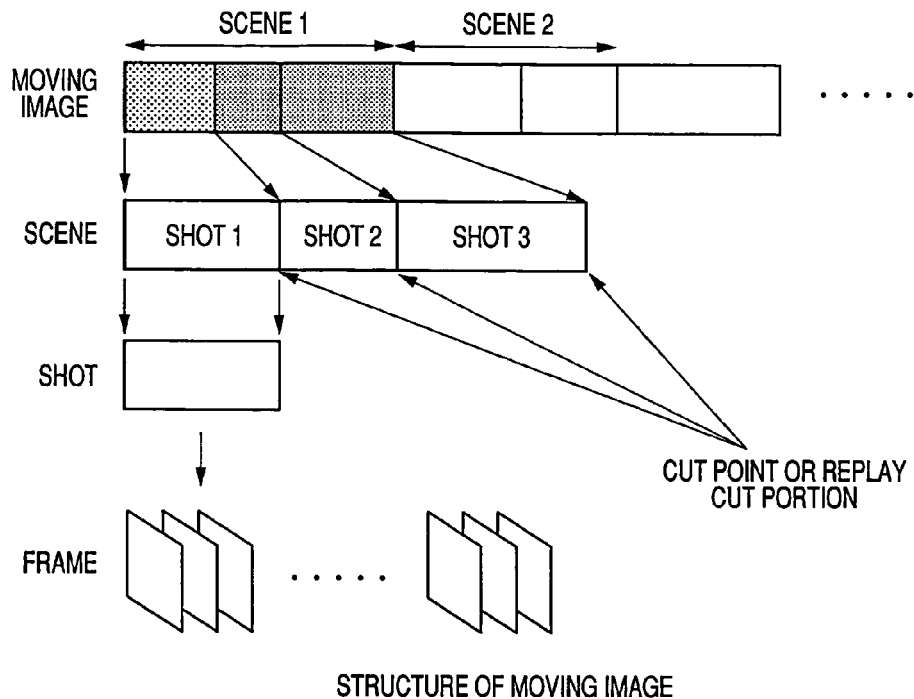
FIG. 5 is a conceptual view illustrating the structure of a typical moving image.

The scene is moving images in continuous scenes with a story. Examples of the scene include a scene when a player shoots (do not score a goal), a goal scene when the player gets the ball into the goal, and the like. As shown in FIG. 5, a plurality of scenes continue in a time-sequential manner and the plurality of continuous scenes form one moving image, such as a soccer game image.

In addition, each scene is configured to include a plurality of continuous shots, as shown in FIG. 5. The shot means a temporally and spatially continuous scenes that are usually caught by one camera, and each shot includes a plurality of continuous frames.

In the present embodiment, the shot includes a shot classified by previous and subsequent cut points and a replay shot classified by previous and subsequent replay cut portions.

In the present embodiment, the shot is classified and defined as follows. In addition, the figure in the following left parentheses indicates a shot symbol used in shot detection to be described later.

(1) Center Long Shot

Shot which reflects the whole ground and whose last three groups of pictures (hereinafter, also referred to as a GOP) are not screens near the goal (2) Goal Long Shot Shot which reflects the whole ground and whose last three GOPs are screens near the goal (3) Close-Up Shot Shot that reflects the close-up of the player (4) Out-Field Shot Shot that reflects the outfield, such as spectators (5) Replay Shot Shot that reflects the replay of a previous image Among the above five kinds of shots, each of the shots (1) to (4) is in a range of a moving image positioned between the previous and subsequent cut points. The cut point is a switching point of an image created by switching of a camera.

Although typical examples of the cut point include an instantaneous cut point (hereinafter, also referred to as a hard cut point) at which an image changes quickly, a dissolve cut point, a wipe cut point, and other special cut points, the cut point treated in the present embodiment is the instantaneous cut point.

In addition, the replay cut portions positioned in foremost and backmost portions of the replay shot (5) are discriminated from the above cut point in the present embodiment, and will be explained in detail later.

Figure 6:
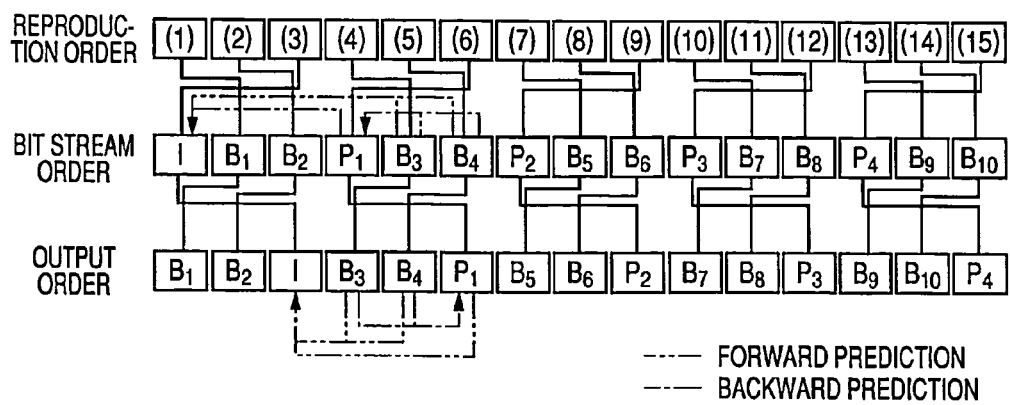
FIG. 6 is a conceptual view illustrating the relationship of reproduction order, bit stream order, and output order regarding video compressed data.

A sequence of frames that form each shot is data in the order of reproduction shown in FIG. 6 but changes to data in the bit stream order shown in FIG. 6 by changing the order when coding is performed.

In addition, the data in the bit stream order returns to the original order (the same order as the reproduction order) by changing the order when decoding is performed, becoming data in the output order shown in FIG. 6.

In the present embodiment, the reproduction order or the output order is called a frame order.

Next, the concept of the above-mentioned replay shot and replay cut portion will be described.

Figure 7:
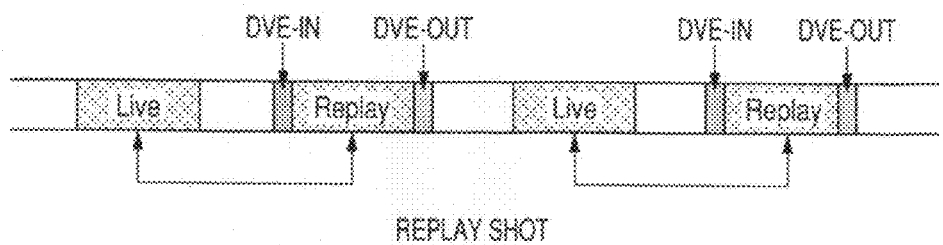
FIG. 7 is a conceptual view illustrating a replay shot.

The replay in a sports image means that when there is a scene, such as shoot, goal, and foul, which draws viewer's interest, images from cameras at various angles regarding the same scene are replayed in a state where an effect, such as slow motion, is added (refer to FIG. 7).

Figure 8:
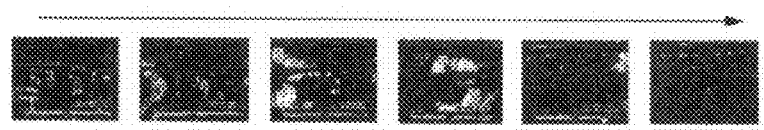
FIG. 8 is an image illustrating an example of a replay cut portion.

Noting the special editing effect added to the replay, a special shot switching operation is added to the start and end of the replay portion in the sports image in many cases. For example, there is a case where a special image shown in FIG. 8 is inserted, or a special shot switching operation, such as a wipe cut, may be added. Such a special switching operation at the start and end of the replay portion is called DVE (digital video effect).

As shown in FIG. 8, a soccer game moving image used in the present embodiment includes an overlay image, which is obtained by overlaying images (for example, images, such as a ball and a flag, which cover the approximately whole screen) other than the soccer game moving image as an example of the DVE.

Figure 9:
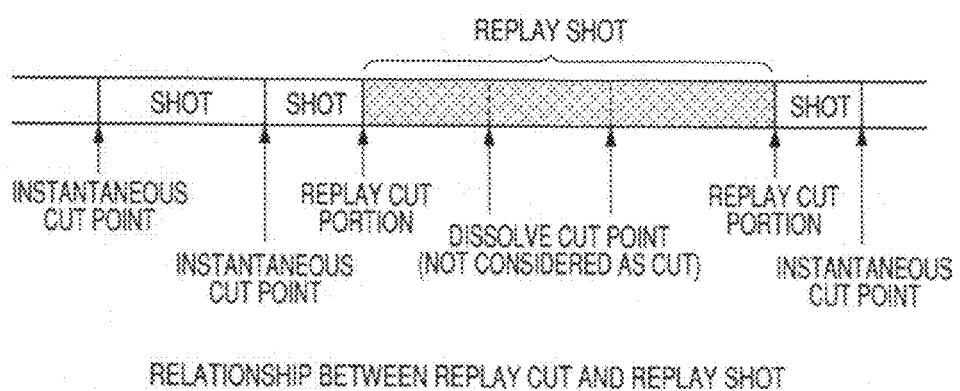
FIG. 9 is a conceptual view illustrating the relationship between a replay cut and a replay shot.

In the present embodiment, portions corresponding to the start and end of the replay portion where DVE is inserted are referred to as replay cut portions, and an image section inserted between two continuous replay cut portions is referred to as a replay shot. In addition, the dissolve cut point may be used as a switching point of a moving image in the moving image section of the replay shot. However, as shown in FIG. 9, this dissolve cut point is not set as a cut point but the replay shot between replay cut portions is determined as one shot.

Next, detection of the instantaneous cut point (replay cut portion is not included) in the present embodiment will be described in detail.

Noting a pair of continuous B frames ($B_i$, $B_{i+1}$), the positions where instantaneous cut points occur are classified into cases of the following (i), (ii), (iii), (iv), and (v).

(i) Case when a cut point is present immediately before $B_i$
(ii) Case when a cut point is present between $B_i$ and $B_{i+1}$
(iii) Case when a cut point is present immediately after $B_{i+1}$
(iv) Case when a cut point is present above the frame of $B_i$
(v) Case when a cut point is present above the frame of $B_{i+1}$ Hereinafter, it will be explained how coding of the B frame is affected when each of the above cases occurs.

In addition, in the following explanation on the cases of (i) to (V), a case where a frame immediately before $B_i$ is an I frame and a frame immediately after $B_{i+1}$ is a P frame is exemplified. However, in any case of (I, P), (P, P), and (P, I) as the combination of the frame immediately before $B_i$ and the frame immediately after $B_{i+1}$, the macroblock type in which the number increases is the same.

In the case of (i), as shown in FIG. 10, since $B_i$ and $B_{i+1}$ cannot acquire similar values even if I or P (I is illustrated in the drawing) immediately before $B_i$ and $B_{i+1}$ is referred, similar I or P (P is illustrated in the drawing) immediately after $B_i$ and $B_{i+1}$ is referred. As a result, the number of macroblocks which performs backward prediction increases in both cases of $B_i$ and $B_{i+1}$.

In the case of (ii), as shown in FIG. 10, $B_i$ refers to I or P (I is illustrated in the drawing) immediately before $B_i$ and $B_{i+1}$ refers to I or P (P is illustrated in the drawing) immediately after $B_{i+1}$ from the similarity of images. As a result, the number of macroblocks which performed forward predictive coding for I or P (I is illustrated in the drawing) immediately before $B_i$ increases in the case of $B_i$ and the number of macroblocks which performed backward predictive coding for I or P (P is illustrated in the drawing) immediately after $B_{i+1}$ increases in the case of $B_{i+1}$.

In the case of (iii), as shown in FIG. 10, both $B_i$ and $B_{i+1}$ refer I or P (I is illustrated in the drawing) from the similarity of images. As a result, in both the cases of $B_i$ and $B_{i+1}$, the number of macroblocks which performed forward predictive coding for I or P (I is illustrated in the drawing) immediately before $B_i$ and $B_{i+1}$ increases.

In the case of (iv), as shown in FIG. 11, there is a characteristic that an intra-coded macroblock occurs. This is noticeable in the case of a field structure formed of two fields in a pixel when one frame is placed in a row in the longitudinal direction. In addition, in $B_{i+1}$, the number of backward predictive macroblocks increases since P and the image are similar.

In the case of (v), similar to the case of (iv), there is a characteristic that an intra-coded macroblock occurs on the $B_{i+1}$ frame as shown in FIG. 11. In addition, in $B_i$, the number of forward predictive macroblocks increases since I and the image are similar.

The above tendency is reflected in the MBT information for every frame, and this is experimentally confirmed by the inventor of the present application by using normal video compressed data coded by MPEG2 that is available on the market.

On the basis of those described above, in the cut detection system, the shot detection system, and the scene detection system 3 according to the present embodiment, the frequency in which a specific macroblock type is included is calculated from the MBT information for every frame, a predetermined MBT symbol is given to every frame according to the frequency characteristic, the MBT symbol string is created by making an arrangement such that the MBT symbols correspond in the order of frames, and the cut point of the moving image is determined from the array feature of the MBT symbols in the MBT symbol string.

More specifically, first of all, the number of intra-coded macroblocks (hereinafter, also referred to as mbIntra), the number of forward predictive-coded macroblocks (hereinafter, also referred to as mbForward), the number of backward predictive-coded macroblocks (hereinafter, also referred to as mbBack), the number of bidirectionally predictive-coded macroblocks (hereinafter, also referred to as mbInter), and the number of other coded macroblocks (hereinafter, also referred to as mbOther) are calculated from the MBT information of each frame.

Then, as shown in the table of FIG. 12, corresponding one of the macroblock type symbols 0, 1, 2, 3, 4, 5, 6, 7, and 8 is given to the B frame which satisfies each condition (in the right columns of the table).

In addition, in the table shown in FIG. 12, an item name of the macroblock type symbol is expressed as Frame Type.

That is, the case where the macroblock type symbol in the table shown in FIG. 12 is set to '0' will be explained in detail. If the frequency of the forward predictive-coded macroblock (mbForward) is largest in the B frame and the sum (mbBack+ mbInter) of the number of backward predictive-coded macroblocks and the number of intra-coded macroblocks is smaller than a predetermined threshold value t (100 in the example shown in the drawing) as the frequency characteristic of the MBT information for every frame, the frequency characteristic is expressed as the number '0' which is the macroblock type symbol set beforehand.

That is, the symbol '0' which is a macroblock type symbol is given to the frame which satisfies the condition.

In addition, the same is true for the case where the macroblock type symbol is set to 1, 2, 3, 4, 5, 6, 7, or 8.

In addition, the condition when the macroblock type symbol is set to '7' satisfies the condition where the macroblock type symbol is set to one of 2, 5, and 6 and satisfies that the number of intra-coded macroblocks is equal to or larger than a predetermined number (for example, 100).

More specifically, one of the three conditions, which are the condition where the number of forward predictive-coded macroblocks is the maximum frequency and the sum of the number of backward predictive-coded macroblocks and the number of intra-coded macroblocks is equal to or larger than a predetermined number (350 in the example shown in the drawing), the condition where the number of backward predictive-coded macroblocks is the maximum frequency and the sum of the number of forward predictive-coded macroblocks and the number of intra-coded macroblocks is equal to or larger than a predetermined number (350 in the example shown in the drawing), and the condition where the number of intra-coded macroblocks is the maximum frequency is satisfied, and it is satisfied that the number of intra-coded macroblocks is equal to or larger than the predetermined threshold value (for example, 100).

Similarly, the condition when the macroblock type symbol is set to '8' satisfies the condition where the macroblock type symbol is set to one of 2, 5, and 6 and satisfies that the number of intra-coded macroblocks is in a predetermined range (for example, in a range of 20 to 100 in the example shown in the drawing).

Furthermore, regarding the conditions when the macroblock type symbols are set to '2', '5', and '7', an upper limit of the threshold value is not described in the table shown in FIG. 12. However, the upper limit may be a maximum number (for example, 1350) of the macroblock in one frame or other proper values may be set.

In addition, the threshold values (for example, 20, 100, and 350) are experimentally set beforehand and may also be suitably changed according to the type of a moving image or other conditions.

In addition, the macroblock type symbol given for every frame as mentioned above is arranged in the order of frames to thereby form a series of MBT symbol string (for example, '023567118314 . . .').

Accordingly, in this MBT symbol string, each MBT symbol expresses the frequency characteristic of the specific macroblock in a corresponding frame.

In addition, according to the above aspect, an explanation on giving the MBT symbol only to the B frame is made, but it may be configured to create the MBT symbol string only from the MBT symbol corresponding to the B frame. In addition, as another example, suitable MBT symbols may also be given to frames (for example, the I frame or P frame) other than the B frame such that the MBT symbol string is created by the array of both MBT symbols of the MTB symbol corresponding to the B frame and the MBT symbols corresponding to the frames other than the B frame.

Then, the cut detection system, the shot detection system, and the scene detection system 3 determine the position of the instantaneous cut point according to the array feature of the MBT symbol in the above MBT symbol string, as shown below.

Figure 13:
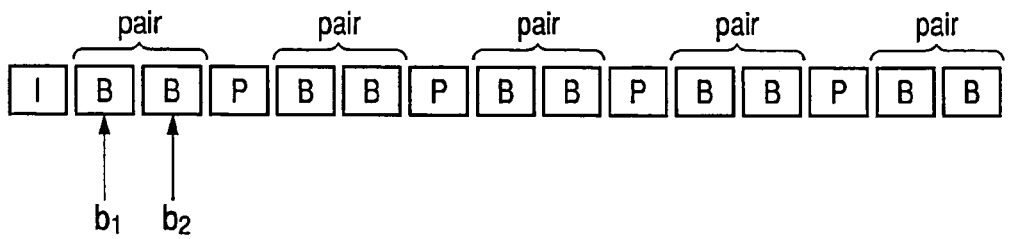
FIG. 13 is a conceptual view illustrating the patterns of instantaneous cut point and replay cut point.

That is, as shown in FIG. 13, noting two MBT symbols b1 and b2 corresponding to the pair of continuous B frames in the series of MBT symbol strings, it is determined whether or not the instantaneous cut point is present immediately before and after and between the two MBT symbols b1 and b2 according to the arrangement pattern.

Now, left two digits indicate the arrangement pattern of the two MBT symbols b1 and b2, and the position of the instantaneous cut point determined according to the arrangement pattern is shown on the right side of the digits.

00: It is determined that a cut point is present after 0 at the end.

0*: It is determined that a cut point is present immediately after 0. In addition, * is assumed to be a number other than 0.

*3: It is determined that a cut point is present immediately after 3. In addition, * is assumed to be a number other than 3.

33: It is determined that a cut point is present immediately before 3 at the head.

11: It is determined that a cut point is present immediately after 1 at the end.

14: It is determined that a cut point is present between 1 and 4.

44: It is determined that a cut point is present immediately before 4 at the head.

17: It is determined that a cut point is present between 1 and 7.

18: It is determined that a cut point is present immediately after 8.

84: It is determined that a cut point is present immediately before 8.

74: It is determined that a cut point is present between 7 and 4.

Next, detection of the replay cut portion will be described.

Figure 14:
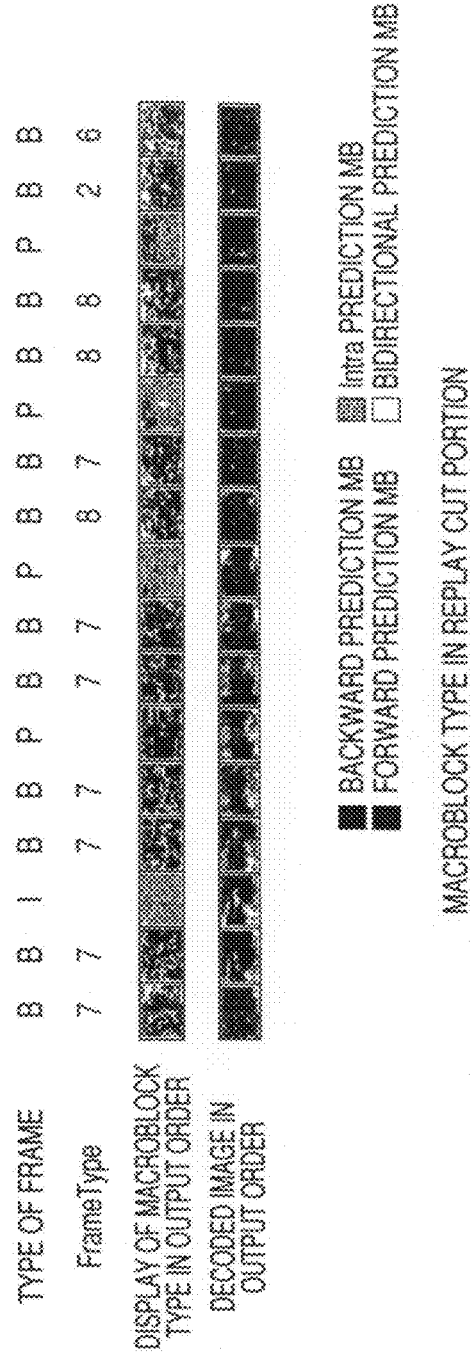
FIG. 14 is a conceptual view illustrating the macroblock type in a replay cut portion.

The rate of intra-coded macroblocks in the B frame tends to increase in the DVE added at the start and end of the replay shot (refer to FIG. 14). This is because an inserted image or image switching changes quickly. In the present embodiment, the replay cut portion is detected by using this as a determination condition.

Specifically, the following two determination conditions are used.

(1) Condition that the number of intra-coded macroblocks in at least one of the two continuous B frames is equal to or larger than a predetermined number (100 or more according to the example shown in FIG. 12).

(2) Condition that the number of intra-coded macroblocks in at least one of the two continuous B frames is in a predetermined range (equal to or larger than 20 and less than 100 according to the example shown in FIG. 12) and the number of two B frames having the pattern is equal to or larger than a predetermined number (for example, 2 or 3 or more, more preferably 3 or more) in a plurality of (for example, two) groups of pictures.

Then, in case where any one of the determination conditions of (1) and (2) is satisfied, the group of picture including the B frame is determined to be a replay cut portion which is a head portion or end portion of the replay shot. In addition, the B frame may also be made to be the replay cut portion.

More specifically, regarding the determination of the replay cut portion, in case where a pattern satisfying the condition that any one of the two MBT symbols b1 and b2 is '7' is present in the MBT symbol string, the group of picture in which the pattern is present is set as the replay cut portion.

In addition, also in case where the condition that three or more pairs, in which any one of the two MBT symbols b1 and b2 is '8', are present in the two continuous groups of pictures is satisfied in the MBT symbol string, the group of picture in which the pattern is present is determined to be the replay cut portion.

Next, detection of the replay shot will be described.

In the cut detection system, the shot detection system, and the scene detection system 3 according to the present embodiment, a point between the replay cut portions determined according to the condition (1) or (2) is determined as the replay shot.

Figure 15:
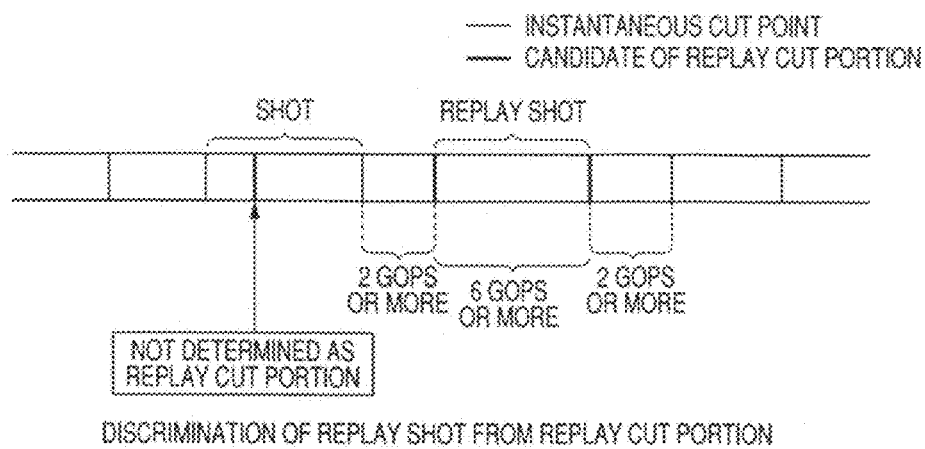
FIG. 15 is a conceptual view illustrating the determination of a replay shot.

In particular, in order to improve the determination precision, more preferably, as shown in FIG. 15, when the pattern (pattern satisfying the condition (1) or (2)) of two replay cut portions is present between the two continuous instant cut points, 2 or more GOPs are present between the instantaneous cut point and a replay cut point subsequent to the instantaneous cut point, and 6 or more GOPs are present between the two replay cut points, the section between these two replay cuts is set as the replay shot.

According to this configuration, in case where the number of intra-coded macroblocks is large particularly in an intense action scene, it can be prevented that such a frame is incorrectly determined as a replay shot.

Consequently, according to the above configuration, in the case where only one replay cut point pattern is present between two continuous instantaneous cut points, the case where 2 GOPs or more are not present between the instantaneous cut point and the replay cut point, or the case 6 GOPs or more are not present between continuously replay cut points, the frame is not determined as a replay shot.

Next, the classification of the shot will be described.

Figure 16:
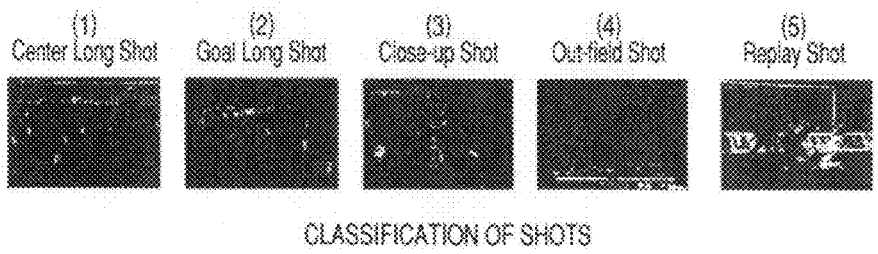
FIG. 16 is an image illustrating an example of shot classification.

Shots of an image in soccer broadcasting are basically classified into five patterns of (1) Center Long Shot, (2) Goal Long Shot, (3) Close-up Shot, (4) Out-field Shot, and (5) Replay Shot, as shown in FIG. 16.

In addition, the shot extracted from video data is expressed as a shot symbol that is different according to the classification. According to an example of the present embodiment, the shot symbol is set to the number (any one of 1 to 5) given to the head of each shot.

In the present embodiment, a motion vector in MPEG data is used as one of the characteristic amounts used for determination of shot classification. Since the motion vector expresses the macroblock positions of previous and subsequent frames referred, the size of the motion vector also changes according to the camera work for an image or the speed of the motion of a player in each shot. The motion vector extracts a motion vector from the P and B frames and calculates the total amount M of the motion vector from Expression 1 (Equation (4.1)) in each GOP.

$$M = \sum_{\Phi} \sqrt{v_x^2 + v_y^2} \qquad (4.1)$$

$\bar{v} = \{v_x, v_y\}$: motion vector
$\Phi$: number of macroblocks in one frame According to the experiment of the inventor of the present application, in the case of (1) Center Long Shot, the motion vector is largely affected by the camera work because a player is not largely reflected. Since the camera work may move left and right or may be stopped, a variation in the motion vector amount expressed by Expression 1 (Equation (4.1)) also increases due to such camera work and as a result, the average motion vector amount in one shot tends to decrease.

Furthermore, in the case of (3) Close-up Shot, the motion vector is largely affected by the movement of a player because the player is largely reflected. Since the player that is largely reflected always moves, a variation in the motion vector amount also decreases and as a result, the average motion vector amount in one shot tends to increase.

Figure 17:
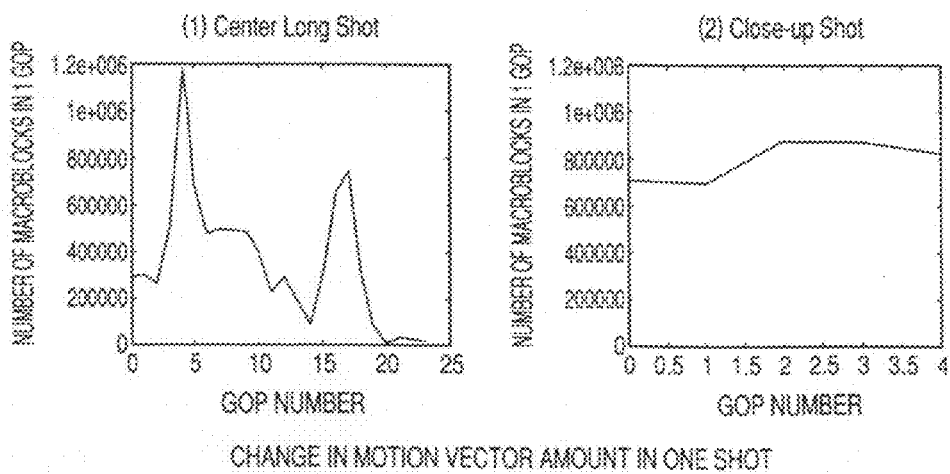
FIG. 17 is a graph illustrating a change in the motion vector amount in one shot.

A change in motion vector amount in the GOP unit in one shot of (1) Center Long Shot and (3) Closer-up Shot is shown in FIG. 17.

It can be seen that there is a clear difference in changes of the motion vector amounts as shown in FIG. 17. In the average motion vector amount bar M obtained by dividing the motion vector amount of one shot by a GOP number (bar M is assumed to indicate the average of M), the bar M is a relatively small value in the case of (1) Center Long Shot, and the bar M is a relatively large value in the case of (3) Close-up Shot compared with the Long Shot. This bar M is used for determination of (1) Long Shot and (3) Close-up Shot.

In addition, since (2) Goal Long Shot is the same Long Shot as (1) Center Long Shot, (2) Goal Long Shot also indicates the same tendency.

Next, a degree of dispersion according to the direction of a motion vector will be described.

In each shot, since each direction of the macroblock position referred by a motion vector has a characteristic, the direction of a motion vector is utilized for determination of shot classification.

(1) In Center Long Shot, since the player is not largely reflected, the direction of a motion vector becomes a direction of movement of camera work and as a result, the directions of motion vectors in a frame become approximately equal to each other.

(3) In Close-up Shot, since the player is largely reflected, the reference position of a motion vector changes to various directions according to the movement of a player's part and as a result, the directions of motion vectors are also dispersed.

The cut detection system, the shot detection system, and the scene detection system 3 according to the present embodiment quantize the direction of the motion vector in four directions of up and down and left and right directions as shown in FIG. 18 and calculate the number of macroblocks in the P and the B frame classified for each direction.

FIG. 19 shows a value of the macroblock number in one frame based on quantization in the direction shown in FIG. 18 in an example of each of (1) Center Long Shot and (3) Close-up Shot. From this drawing, it can be seen that the direction of a motion vector concentrates on one direction in (1) Center Long Shot, while the direction of a motion vector is dispersed in four directions in (3) Closer-up Shot.

In order to calculate a variation in each direction from the quantized macroblock number, a degree of dispersion D is calculated from the following Expression 2 (Equation (4.2)).

The degree of dispersion D is calculated for each one frame from the P and B frames and the average is calculated for every GOP.

$$D = \frac{1}{n} \sum_{k=1}^{n} (x_k - \bar{x})^2 \qquad (4.2)$$

$$= \frac{1}{n}(n_1(1-\bar{x})^2 + n_2(2-\bar{x})^2 + n_3(3-\bar{x})^2 + n_4(4-\bar{x})^2)$$

$x_k$: value of each direction (1, 2, 3, 4)
$n_1, n_2, n_3, n_4$: each macroblock number classified by quantization of direction
$n = n_1 + n_2 + n_3 + n_4$: number of all macroblocks of one frame $$x = \frac{1 \cdot n_1 + 2 \cdot n_2 + 3 \cdot n_3 + 4 \cdot n_4}{n}$$

Figure 20:
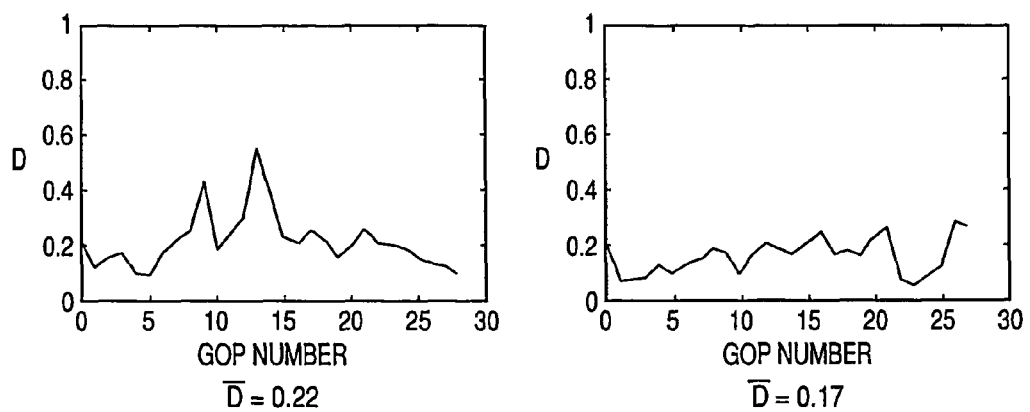
FIG. 20 is a graph illustrating a change in a degree of dispersion in the direction of a motion vector in a center long shot.
Figure 21:
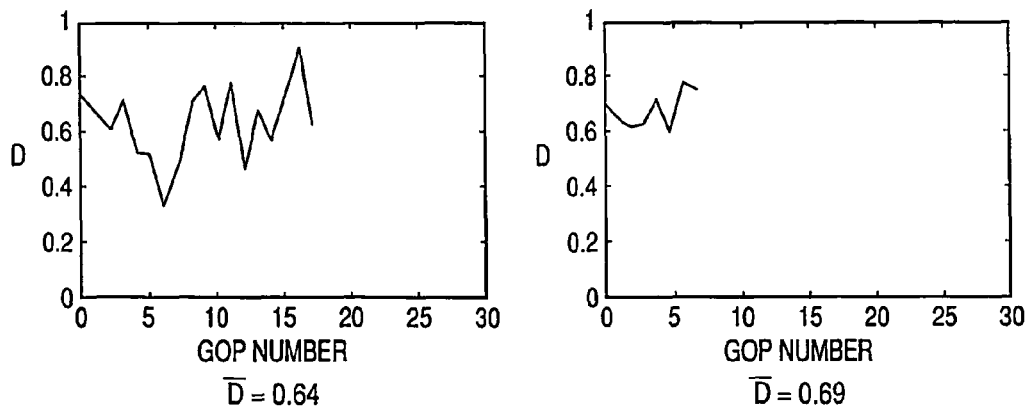
FIG. 21 is a graph illustrating a change in a degree of dispersion in the direction of a motion vector in a close-up shot.
Figure 25:
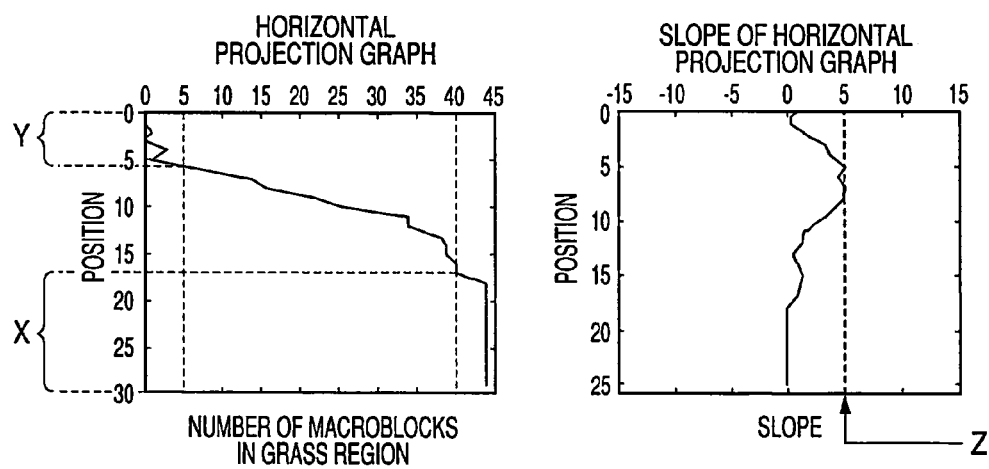
FIG. 25 is a graph illustrating the slope of a horizontal projection graph.

In addition, a change in the degree of dispersion D in the GOP unit in one shot and an average bar D (bar D is assumed to indicate the average of D) of D in one shot of (1) Center Long Shot and (3) Close-up Shot are shown in FIGS. 20 and 21. From these drawings, it can be seen that the average bar D of D in one shot is about 0.2 in the case of (1) Center Long Shot and is about 0.65 in the case of (3) Close-up Shot and therefore, there is a large difference between degrees of dispersion.

According to the present embodiment, the bar D is used for determination of (1) Center Long Shot and (3) Close-up Shot.

Next, determination of a ground region based on a color component will be described.

In the Long Shot, there is a characteristic that the slope of a borderline of a ground region on a screen near the goal area is larger than that on a screen of the center of the ground. In the present embodiment, (1) Center Long Shot and (2) Goal Long Shot among Long Shot are discriminated from each other by using such characteristic.

As the characteristic amount for extracting the region of the ground, color information of the luminance and a color difference component in MPEG data is used. The range of the luminance and color difference (Y, Cb, and Cr) as color information on the ground, that is, grass, is set beforehand, so that a macroblock having the luminance and color difference within the range is determined to be a block on the ground.

In the example of the present embodiment, the luminance, the color difference, and the range of the ratio r=Cb/Cr was set like Expression 3 (Equation (4.3)). Since a predetermined value is set to r that is a ratio of color difference components regarding the color of the grass, a macroblock included in a grass region can be extracted by setting the range of r, the ranges of the color differences Cb and Cr, and the range of the luminance Y indicating the brightness.

$$0.68 \le r \le 1.1,\ 85 \le y \le 145,\ 80 \le C_b \le 125,\ 9 \le C_r \le 130 \qquad (4.3)$$

More specifically, the cut detection system, the shot detection system, and the scene detection system 3 divide the I frame into a plurality of horizontal lines parallel to one another and calculate the number of macroblocks, in which the luminance component Y, the color difference component Cb, the color difference component Cr, and the ratio of color difference components r=Cb/Cr each satisfy the color condition expressed in Expression 3 (Equation (4.3)), for every line.

According to the experiment of the inventor of the present application, a ground region can be precisely extracted by using Expression 3 (Equation (4.3)). For example, a green uniform that the player wears could be avoided and the grass of a ground portion as the shadow of the stadium was also able to be extracted.

In order to express the slope of a borderline of a ground region, the horizontal projection graph in which the number of macroblocks of the extracted ground portion is added for every one horizontal line is shown in FIGS. 22, 23, and 24.

Moreover, in FIGS. 22, 23, and 24, the slope of the horizontal projection graph is expressed by calculating the slope of the graph from the horizontal projection graph of the ground region with the least square method in a predetermined range (for example, range=3) and shifting the range one by one.

That is, the slope of the horizontal projection graph indicates the degree of a change in the macroblock number, which indicates the grass, with respect to the change amount when the horizontal line is changed in the vertical direction in the case where frames are divided into a plurality of horizontal line parallel to one another.

Furthermore, in the least square method, a straight line which fits most is set to y=ax+b when n data (x1, y1), (x2, y2), and (xn, yn) are obtained, and the slope a is calculated from Expression 4 (Equation (4.4)).

$$a = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad (4.4)$$

In FIGS. 22, 23, and 24, it is assumed that the vertical direction is a y axis and the horizontal direction is an x axis.

Each of FIGS. 22, 23, and 24 shows an image of the representative frame, a horizontal projection graph of a ground region, and the slope of the horizontal projection graph sequentially from the left in a representative example of each of the (1) Center Long Shot, (2) Goal Long Shot, and (3) Close-up Shot.

In the example of the present embodiment, three values including the number X of positions (lines) where the number of macroblocks of a ground region is 40 or more, the number Y of positions (lines) where the number of macroblocks of a ground region is 5 or less, and the maximum value Z of the slope are calculated from FIGS. 22, 23, and 24.

In addition, these three characteristic amounts are used for determination of (1) Center Long Shot, (2) Goal Long Shot, (3) Close-up Shot, (4) Out-field Shot, and the like.

That is, in the case of (1) Center Long Shot shown in FIG. 22, since the borderline of a ground region is a horizontal straight line, the maximum value Z of the slope of the horizontal projection graph becomes large. Moreover, the number X of vertical positions where the number of macroblocks of a ground region in the horizontal direction is 40 or more becomes 20 or more, and the position number X equal to or larger than 40 and the position number Y equal to or smaller than 5 occupy most of the positions in the vertical direction. Accordingly, X+Y becomes 25 or more.

On the other hand, in the case of (2) Goal Long Shot shown in FIG. 23, since the slope of the borderline of the ground region with respect to the horizontal direction is gentle, the maximum value Z of the slope of the horizontal projection graph becomes smaller than (1) Center Long Shot. In addition, as for X, a region becomes smaller than that in (1) Center Long Shot. Accordingly, the range of X is equal to or larger than 10 and less than 20, and X+Y is equal to or larger than 10 and less than 25.

In the case of (3) close-up Shot shown in FIG. 24, since the player is reflected, the number of macroblocks determined to be the ground region is reduced. For this reason, since the region of X and the region of Y become small, X+Y becomes less than 15.

Figure 26:
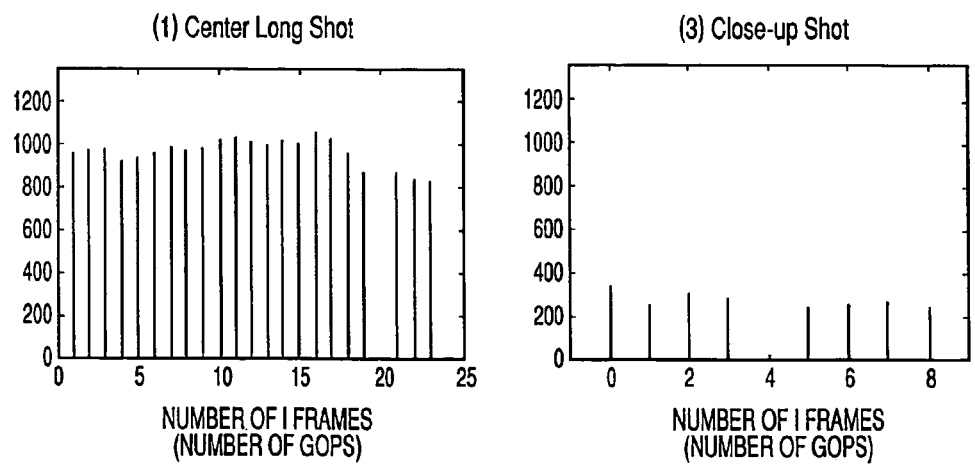
FIG. 26 is a graph illustrating the number of macroblocks in a ground region within the I frame.

Furthermore, as shown in FIG. 26, the macroblock number T of the ground region within the I frame is characterized in that the macroblock number of the ground region is large in the case of (1) Center Long Shot and the macroblock number of the ground region is small in the case of (3) Close-up Shot. Consequently, the macroblock number T determined to be a ground region within the I frame of GOP is used for shot determination.

In addition, the cut detection system, the shot detection system, and the scene detection system 3 according to the present embodiment calculate the following value as the characteristic amount used for determination of shots other than the replay shot.

Bar M: average of motion vector in 1 shot

Bar D: average of degree of dispersion value of motion vector in 1 shot

Bar T: average of the number of macroblocks of the ground region in I frame of last 3 GOPs of a shot Bar X: average of the position number (line number) where a horizontal row of ground region in I frame of last 3 GOPs of a shot is 40 or more Bar Y: average of the position number (line number) where a horizontal row of ground region in I frame of last 3 GOPs of a shot is 5 or less Bar Z: average of the maximum value of the slope of the ground region in I frame of last 3 GOPs of a shot.

Figure 27:
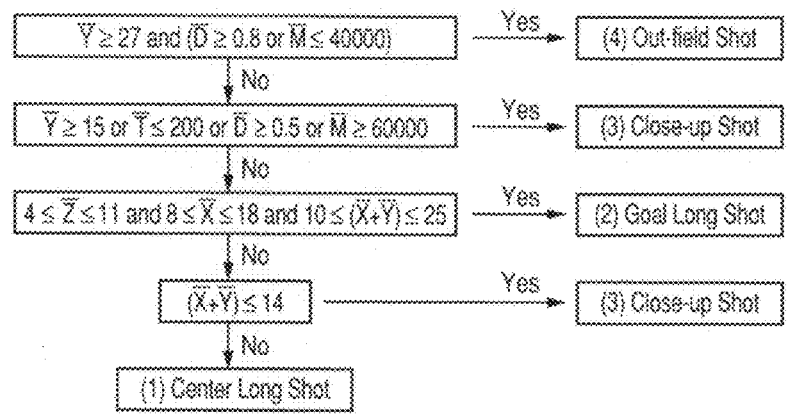
FIG. 27 is a conceptual view illustrating the flow of shot determination.

The flow of shot determination using the motion vector mentioned above and the characteristic amount of color information is shown in FIG. 27.

More specifically, regarding a shot that is separated by the instantaneous cut point and is not the replay shot, the cut detection system, the shot detection system, and the scene detection system 3 first determine the shot to be (4) Out-field Shot if bar Y≥27 and the condition (bar D≥0.8 or bar M≤40000) is satisfied. In addition, the following processing is performed in other cases.

Then, when one of the conditions of bar Y≥15, bar T≤200, bar D≥0.5, and bar M≥60000 is satisfied, the shot is determined to be (3) Close-up Shot. The following processing is performed in other cases.

Then, when three conditions of 4≤bar Z≤11, 8≤bar X≤18, and 10≤(bar X+bar Y)≤25 are all satisfied, the shot is determined to be (2) Goal Long Shot. The following processing is performed in other cases.

Then, the shot is determined to be (3) Close-up Shot when the condition of (bar X+bar Y)≤14 is satisfied, and the shot is determined to be (1) Center Long Shot in other cases.

In addition, each threshold value in FIG. 27 indicates an example especially preferable for a case where an object of shot determination is a soccer game image.

In addition, according to the example shown in the drawing, there is a condition where an upper limit or lower limit of a threshold value is not specified, but a proper value may be specified as follows.

For example, an uppermost value of the bar Y may be set to the maximum macroblock number (for example, 30) in the vertical direction in one frame.

In addition, an uppermost value of the bar D may be set to 1, for example.

In addition, a lowermost value of the bar M may be set to 0, for example.

In addition, an uppermost value of the bar M may be set to the amount of all motion vectors in one shot, for example.

In addition, a lowermost value of the bar T may be set to 0, for example.

In addition, a lowermost value of (bar X+bar Y) may be set to 0, for example.

Next, a detector for determining a scene from the array feature regarding the five shots determined as mentioned above will be described.

In the present embodiment, scenes to be detected are a goal scene and a shoot scene. The goal scene is defined as a scene where a shot ball enters into the goal to be scored.

On the other hand, the shoot scene is defined as a scene where a player on the attack side shoots toward the goal on the defense side and the ball crosses a goal line without entering between the goal posts. Specifically, a scene where the ball that the player on the attack side kicked crosses the goal line within the penalty area on the defense side directly or by blocking of the keeper and a replay shot is inserted after the shot of shooting is targeted. That is, this is because the scene where the replay shot is inserted is a scene to which a producer of the program pays attention and is an important scene that viewers especially want to see.

In the case of a specific scene, such as a goal scene, a typical pattern exists in a change in a series of shots. As an example, the flow of the shot of a goal scene and the flow of the shot of a shoot (no goal) scene are shown in FIGS. 28 and 29, respectively.

Figure 28:
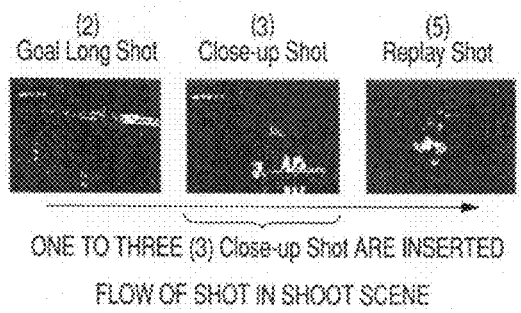
FIG. 28 is an image illustrating an example of the pattern of a shoot scene.

As shown in FIG. 28, in the case of a typical shoot scene of a soccer game image, there is a tendency that one to three shots of (3) Close-up Shot are inserted after (2) Goal Long Shot and then one or two shots of (5) Replay Shot are inserted.

Figure 29:
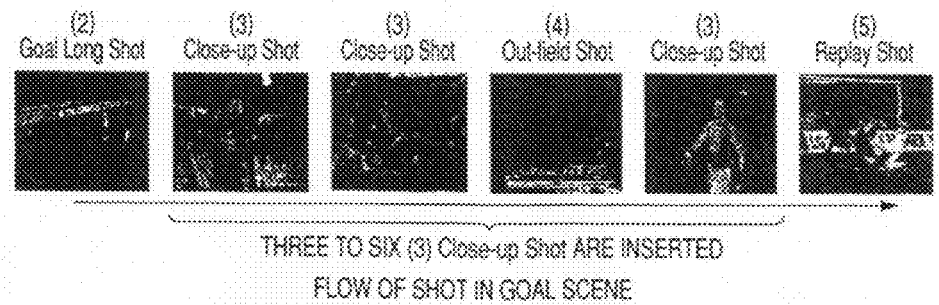
FIG. 29 is an image illustrating an example of the pattern of a goal scene.

On the other hand, in the case of the goal scene shown in FIG. 29, three to five shots of (3) Close-up Shot larger than that in the shoot scene are inserted after (2) Goal Long Shot, and (4) Out-field Shot may also be inserted therebetween in many cases. In addition, the number of replay shots tends to be larger than three or four shots and the shoot scene.

In the present embodiment, such a characteristic of the transition pattern of a shot is used to discriminate the goal scene from the shoot scene and to detect them.

That is, the cut detection system, the shot detection system, and the scene detection system 3 according to the present embodiment perform symbolization, that is, label attachment of each shot for each shot according to classification shown in FIG. 16 and replaces video data with a symbol string of a corresponding shot.

As shown in FIG. 28 or 29, since a pattern corresponding to a change in specific shots exists in a specific scene, a typical pattern unique to a scene also exists in a symbol string of a shot. A scene is detected by performing pattern matching processing for such a typical symbol string pattern of a scene and a symbol string of video data. DP matching to be described later is used as the pattern matching processing.

More specifically, the cut detection system, the shot detection system, and the scene detection system 3 creates a shot symbol string (referred to as a shot type string in the example shown in the drawing) by giving a shot symbol (numbers of 1 to 5 in the example shown in the drawing) corresponding to the type to each shot detected from video data and then the shot symbol string is stored in a predetermined storage region (shot symbol string storage) of a storage device, as shown in FIG. 30.

In addition, a model pattern symbol string (number string, such as 2335 or 2333435, in the example shown in the drawing) obtained by arraying a plurality of shot symbols so as to correspond to a scene to be detected is stored beforehand in a predetermined storage region (model pattern storage) of the storage apparatus.

As an example of the model pattern symbol string, as shown in FIG. 28 (flow of the shot in a shoot scene), a symbol string '235' or a symbol string '2335' obtained by arraying the shot symbol (2) indicating the goal long shot which is a shot reflecting the ground and in which the last three groups of pictures are images near the goal, the shot symbol (3) indicating the close-up shot that reflects close-up of the player, and the shot symbol (5) indicating the replay shot that reflects repetition of a previous image in this order is preferable.

In addition, as another example of the model pattern symbol string, as shown in FIG. 29 (flow of the shot in the shoot scene), a symbol string '23435', a symbol string '233435', or a symbol string '2333435' obtained by arraying the shot symbol (2) indicating the goal long shot which is a shot reflecting the ground and in which the last three groups of pictures are images near the goal, the plurality of shot symbols (3) indicating the close-up shot that reflects close-up of the player, the shot symbol (4) indicating the out-field shot that reflects the outfield, the shot symbol (3) indicating the close-up shot that reflects close-up of the player again, and the shot symbol (5) indicating the replay shot that reflects repetition of a previous image in this order is preferably adopted.

In addition, the cut detection system, the shot detection system, and the scene detection system 3 according to the present embodiment include a detector for detecting a symbol string corresponding to the model pattern symbol string of the model pattern storage from the shot symbol string of the shot symbol string storage.

This detector performs pattern matching processing for detecting a symbol string, which approximately matches the model pattern symbol string, from the shot symbol string by comparing the shot symbol string with the model pattern symbol string.

In this processing, the symbol string of the shot symbol string and the model pattern symbol string are preferably made to match with the proper similarity set beforehand.

For example, according to FIG. 30, the model pattern symbol string '2335' is determined to approximately match '235' of the shot symbol string, even though the model pattern symbol string '2335' does not completely match '235' of the shot symbol string. Similarly, the model pattern symbol string '2333435' is also determined to approximately match '233435' of the shot symbol string.

In the present embodiment, DP matching processing is used as a specific technique of the pattern matching processing. Hereinafter, the DP matching processing will be described in detail.

Examples of the technique of calculating the similarity of a time series pattern include a dynamic programming method (DP matching) widely used for sound recognition etc., a hidden Markov model (HMM), and the like.

The dynamic programming matching (DP matching) is a technique of calculating the optimal correspondence with the similarity of two different time series signals and is used in various fields, such as sound recognition. The DP matching can calculate the similarity of patterns having different lengths by nonlinear expansion and contraction. Due to these advantages, the DP matching is used as the technique of calculating the similarity between time series patterns in the present embodiment.

A specific method for realizing the DP matching will be described using FIG. 31.

Two patterns A and B are expressed as time series of a feature vector. That is, the two patterns A and B are expressed by Expression 5 (Equation 5.1).

$$A = a_1 a_2 \ldots a_I$$

$$B = b_1 b_2 \ldots b_J \quad (5.1)$$

Here, the time correspondence of both the patterns A and B, that is, an expansion and contraction function can be expressed by the sequence F of a lattice point ck=(i, j) on a flat surface of FIG. 31.

$$F = c_1 c_2 \ldots c_K \quad (5.2)$$

If a (spectrum) distance between two feature vector strings ai and bj is expressed as d(c)=d(i, j), the total sum of distance along F can be expressed by Expression 7 (Equation 5.3), and it is indicated that the smaller the value is, the better matching between A and B is. Here, wk is a positive weighting function relevant to F.

Here, it is considered to perform minimization regarding F by limiting the above Equation as follows.

$$D(F) = \sum_{k=1}^{k} d(c_k) w_k \bigg/ \sum_{k=1}^{k} w_k \quad (5.3)$$

(1) Conditions of monotonicity and continuity $$0 \le i_k - i_{k-1} \le 1, \; 0 \le j_k - j_{k-1} \le 1$$

(2) Boundary condition $$i_1 = j_1 = 1, \; i_K = I, \; j_K = J$$

(3) Condition of matching window: r is defined as a fixed number in order to prevent extreme expansion and contraction, $$|i_k - j_k| \le r$$

Taking a partial sum of a partial point string $c_1 c_2 \ldots c_K$ ($c_K = (i, j)$) into consideration, $$\begin{aligned} g(c_k) = g(i, j) &= \min_{c_1, \ldots, c_{k-1}} \left[ \sum_{l=1}^{k} d(c_l) w_l \right] \\ &= \min_{c_1, \ldots, c_{k-1}} \left[ \sum_{l=1}^{k-1} d(c_l) w_l + d(c_k) w_k \right] \\ &= \min_{c_1, \ldots, c_{k-1}} \left[ \min_{c_1, \ldots, c_{k-2}} \left\{ \sum_{l=1}^{k-1} d(c_l) w_l \right\} + d(c_k) w_k \right] \\ &= \min_{c_{k-1}} [g(c_{k-1}) + d(c_k) w_k] \end{aligned} \quad (5.4)$$

Figure 32:
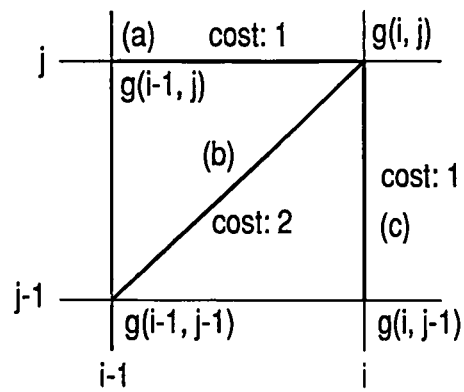
FIG. 32 is a conceptual view illustrating calculation of the partial sum g(i, j) at point (i, j) in the DP matching processing.

In consideration of the weighted average of distances taken along the point sequence F, matching between the two patterns A and B is performed by changing F so that the value becomes a minimum. Here, extreme expansion and contraction of the time axis are not permitted in the change of F, and only three methods shown in FIG. 32 are considered. Assuming that the distance between two feature vectors ai and bj is expressed as d(c)=d(i, j) and the partial sum of the partial lattice string c1c2...ck is g(ck)=g(i,j), recurrence expression like Expression 9 (Equation (5.5)) is obtained by the principle of optimality (subsequence of the optimal policy is also an optimal policy).

$$g(i, j) = \min \begin{cases} g(i-1, j): & (a) \\ g(i-1, j-1): & (b) \\ g(i, j-1): & (c) \end{cases} + d(i, j). \quad (5.5)$$

Such calculation is performed and g(I, J) that is finally calculated is the minimum of the distance between the two patterns A and B, and it can be said that F at that time is a time transform function indicating optimal matching. The length of a path selected up to the lattice point (i, j) is calculated by Expression 10 (Equation (5.6)).

$$c(i, j) = \begin{cases} c(i-1, j) + 1: & \text{if } (a) \\ c(i-1, j-1) + 2: & \text{if } (b) \\ c(i, j-1) + 1: & \text{if } (c) \end{cases} \quad (5.6)$$

When it reaches i=J, the cumulative distance of Expression 9 (Equation (5.5)) is divided by the path length of Expression 10 (Equation (5.6)) to thereby perform normalization of distance. Then, the optimal path can be searched by calculating a path where G(i, J) becomes a minimum in the matching window.

$$G(i, J) = \frac{g(i, J)}{c(i, J)} \quad (5.7)$$

Figure 33:
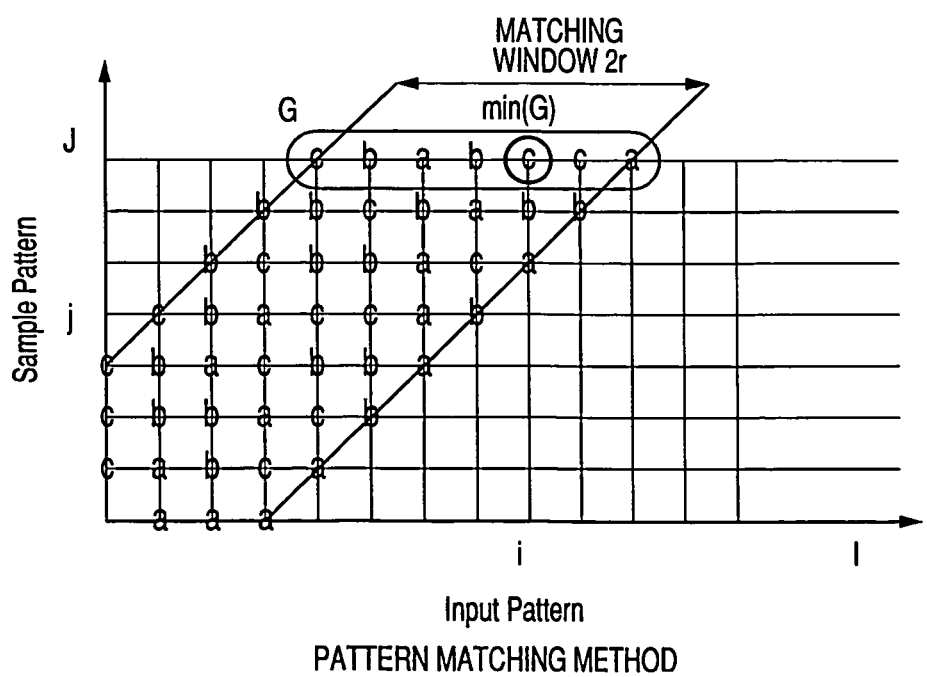
FIG. 33 is a conceptual view illustrating a pattern matching method in the DP matching processing.

Moreover, in FIG. 33, a sequence up to i of min(G) where a value from a starting point of i=0 to G(i, J) in Input Pattern becomes a minimum becomes a sequence that most matches Sample Pattern at the starting point. In addition, the sequence of Input Pattern up to min(G) is calculated by shifting the starting point by 1 like i=1, 2, . . . , I. From the patterns, a pattern where min(G) becomes equal to or smaller than the threshold value can be calculated as a sequence most similar to Sample Pattern.

Next, a result obtained when the cut detection system, the shot detection system, and the scene detection system 3 detects a cut point, a shot, a replay shot, and a scene from the MPEG2 data of an actual soccer game image will be described.

Here, in the case of a moving image of the soccer game image, the resolution is 640×480, the bit rate is VBR (variable bit rate) of 5.5 Mbps in average and 8 Mbps in maximum, profile and level are MP@ML, GOP has a configuration of N=2 in which two B frames continue after the P frame like IBBPBBPBBPBBPBBIBB . . . . Basically one GOP includes total 15 sheets of one I frame, four P frames, and ten B frames. However, other random GOPs also exist. The random GOP in this case is constituted as multiples of 3 less than 15 sheets.

As a result, as shown in FIGS. 34 to 37, it was possible to obtain the relatively high detection result in any of the cut point, the shot, the replay shot, and the scene.

In addition, according to the embodiment described above, the cut point, the shot, the replay shot, the scene, and the like regarding the soccer game image were detected. However, as other examples, it may be applied to other kinds of moving images, such as an image of sumo wrestling, a baseball image, and melodrama, by appropriately changing the color information range (0.68≤r≤1.1, 85≤Y≤145, 80≤Cb≤125, 95≤Cr 130), the range of the characteristic amount (bar M, bar D, bar T, bar X, bar Y, and bar Z), and the like.

In addition, in the above embodiment, the MPEG2 data was treated as an especially preferable aspect. However, other video compressed data including the afore-mentioned macroblock information, motion vector information, and luminance and color difference information, and the like may also be treated. For example, MPEG1 data, MPEG4 data, H.264 data, and other video compressed data may be processed.

What is claimed is:

1. A cut detection system comprising:
    an extractor configured to extract macroblock type information at least for every B frame from video compressed data including the macroblock type information;
    a calculator configured to calculate a number of intra-coded macroblocks for every frame from the extracted macroblock type information, a number of forward predictive-coded macroblocks for every frame, and a number of backward predictive-coded macroblocks for every frame from the macroblock type information; and
    a detector configured to detect the B frame or a group of picture including the B frame to be a replay cut portion, which is a head portion or last portion of a replay shot, by using a frequency characteristic of the intra-coded macroblocks included in the B frame as determination conditions, wherein
    the determination conditions include a condition that the number of intra-coded macroblocks in at least one of two continuous B frames is equal to or larger than a predetermined number, and
    a condition that the number of forward predictive-coded macroblocks is a maximum frequency and the sum of the number of backward predictive-coded macroblocks and the number of inter-coded macroblocks is smaller than a predetermined number.

2. A cut detection system comprising:
    an extractor configured to extract macroblock type information at least for every B frame from video compressed data including the macroblock type information;
    a calculator configured to calculate a number of intra-coded macroblocks for every frame from the extracted macroblock type information, a number of forward predictive-coded macroblocks for every frame, and a number of backward predictive-coded macroblocks for every frame from the macroblock type information; and
    a detector configured to detect the B frame or a group of picture including the B frame to be a replay cut portion, which is a head portion or last portion of a replay shot, by using a frequency characteristic of the intra-coded macroblocks included in the B frame as determination conditions, wherein
    the determination conditions include a condition that the number of intra-coded macroblocks in at least one of two continuous B frames is in a predetermined range and the number of two B frames having the pattern is equal to or larger than a predetermined number in a plurality of groups of pictures, and
    a condition that the number of forward predictive-coded macroblocks is a maximum frequency and the sum of the number of backward predictive-coded macroblocks and the number of inter-coded macroblocks smaller than a predetermined number.

3. A cut detection system comprising:
    an extractor configured to extract macroblock type information at least for every B frame from video compressed data including the macroblock type information;
    a calculator configured to calculate a number of intra-coded macroblocks for every frame from the extracted macroblock type information, a number of forward predictive-coded macroblocks for every frame, and a number of backward predictive-coded macroblocks for every frame from the macroblock type information; and
    a detector configured to detect the B frame or a group of picture including the B frame to be a replay cut portion, which is a head portion or last portion of a replay shot, by using a frequency characteristic of the intra-coded macroblocks included in the B frame as determination conditions, wherein
    the determination conditions include a condition that the number of intra-coded macroblocks in at least one of two continuous B frames is equal to or larger than a predetermined number, and
    a condition where the number of backward predictive-coded macroblocks is a maximum frequency and the sum of the number of forward predictive-coded macroblocks and the number of inter-coded macroblocks is smaller than a predetermined number.

4. A shot detection system using the cut detection system according to claim 1 that determines a portion between two continuous replay cut portions within a plurality of replay cut portions, which are detected by the cut detection system, to be a replay shot.

5. A shot detection system using the cut detection system according to claim 1 that when two continuous replay cut portions within a plurality of replay cut portions, which are detected by the cut detection system, are positioned between two continuous instantaneous cut points, determines a portion between the two continuous replay cut portions to be a replay shot that shows repetition of a previous image.

6. The shot detection system according to claim 4,
    wherein a condition that a predetermined number of groups of pictures or more are included between one of the two continuous replay cut portions and an instantaneous cut point subsequent to the one replay cut portion is added to the determination conditions of the replay shot.

7. The shot detection system according to claim 4,
    wherein a condition that a predetermined number of groups of pictures or more are included between the two continuous replay cut portions is added to the determination conditions of the replay shot.

8. The shot detection system according to claim 4, further comprising:
    an extractor configured to extract motion vector information for every frame regarding a shot extracted from video compressed data;
    a calculator configured to calculate a motion vector amount for every frame from the motion vector information; and
    a calculator configured to calculate an average motion vector amount, which is obtained by dividing the motion vector amount of one shot by the number of groups of pictures, regarding the extracted shot,
    wherein the extracted shot is determined as a specific shot by using a determination condition that the average motion vector amount is within a predetermined range.

9. The shot detection system according to claim 4, further comprising:
    an extractor configured to extract motion vector information for every frame regarding a shot extracted from video compressed data;
    a quantizing unit configured to quantize a direction of a motion vector in a predetermined number of directions for every macroblock of each frame;
    a calculator configured to calculate a degree of dispersion for every frame regarding the directions of motion vectors classified by the quantization; and a calculator configured to calculate an average degree of dispersion, which is obtained by dividing the degree of dispersion of one shot by the number of groups of pictures, regarding the extracted shot, wherein the extracted shot is determined as a specific shot by using a determination condition that the degree of dispersion is within a predetermined range.

10. The shot detection system according to claim 4, further comprising:

an extractor configured to extract a luminance component Y, a color difference component Cb, and a color difference component Cr for every I frame from video compressed data;

a divider configured to divide each I frame into a plurality of parallel lines and calculating the number of macroblocks satisfying a color condition, in which each of the luminance component Y, the color difference component Cb, the color difference component Cr, and a ratio between the color difference components r=Cb/Cr, for each of the lines; and a calculator configured to calculate an average value of lines, in which the number of macroblocks satisfying the color condition is within a predetermined range, for every I frame, wherein a shot including an I frame where the average value is within the predetermined range is determined as a specific shot.

11. The shot detection system according to claim 4, wherein a degree of a change in the number of macroblocks with respect to a line change is calculated for every I frame, and a shot including an I frame where a maximum value of the degree is within a predetermined range is determined as a specific shot.

12. A scene detection system using the shot detection system according to claim 4, comprising:

a generator configured to generate a shot symbol string by giving a shot symbol corresponding to the type to each shot detected by the shot detection system;

a storage configured to store a model pattern symbol string which is obtained by arraying a plurality of shot symbols so as to correspond to a scene to be detected; and a detector configured to detect a symbol string, which corresponds to the model pattern symbol string of the model pattern storage, from the shot symbol string, wherein continuous shots of the video data corresponding to the symbol string detected by the detector are recognized as a specific scene.

13. The scene detection system according to claim 12, wherein the detector performs pattern matching processing for detecting a symbol string, which approximately matches the model pattern symbol string, from the shot symbol string by comparing the shot symbol string with the model pattern symbol string.

14. A cut detection method comprising:

extracting macroblock type information at least for every B frame from video compressed data including the macroblock type information by a computer;

calculating a number of intra-coded macroblocks for every frame from the extracted macroblock type information by the computer, a number of forward predictive-coded macroblocks for every frame, and a number of backward predictive-coded macroblocks for every frame from the macroblock type information; and determining the B frame or a group of picture including the B frame to be a replay cut portion, which is a head portion or last portion of a replay shot, by using a frequency characteristic of the intra-coded macroblocks included in the B frame as determination conditions by the computer, wherein the determination conditions include a condition that the number of intra-coded macroblocks in at least one of two continuous B frames is equal to or larger than a predetermined number, and a condition that the number of forward predictive-coded macroblocks is a maximum frequency and the sum of the number of backward predictive-coded macroblocks and the number of inter-coded macroblocks is smaller than a predetermined number.

* * * * *